(12) United States Patent
Fukuda

(10) Patent No.: US 8,817,985 B2
(45) Date of Patent: Aug. 26, 2014

(54) ENCRYPTION KEY DISTRIBUTION SYSTEM

(75) Inventor: Naohiro Fukuda, Funabashi (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 13/380,742

(22) PCT Filed: Jun. 23, 2010

(86) PCT No.: PCT/JP2010/060635
§ 371 (c)(1),
(2), (4) Date: Dec. 28, 2011

(87) PCT Pub. No.: WO2010/150813
PCT Pub. Date: Dec. 29, 2010

(65) Prior Publication Data
US 2012/0106735 A1    May 3, 2012

(30) Foreign Application Priority Data

Jun. 23, 2009 (JP) ................................ 2009-148961

(51) Int. Cl.
*H04K 1/00*    (2006.01)
*H04L 9/32*    (2006.01)
*H04L 9/08*    (2006.01)

(52) U.S. Cl.
CPC ........... *H04L 9/3242* (2013.01); *H04L 2209/76* (2013.01); *H04L 9/321* (2013.01); *H04L 9/083* (2013.01)
USPC ....................................................... 380/255

(58) Field of Classification Search
CPC ....... H04L 9/083; H04L 9/321; H04L 9/3242; H04L 63/0428; H04L 9/08; H04L 9/00
USPC ....................................................... 380/255
See application file for complete search history.

(56) References Cited

U.S. PATENT DOCUMENTS

| 5,729,608 A | 3/1998 | Janson et al. |
| 2003/0229789 A1 | 12/2003 | Morais et al. |

(Continued)

FOREIGN PATENT DOCUMENTS

| JP | 3078841 B2 | 8/2000 |
| JP | 2002-51036 A | 2/2002 |
| JP | 2004-015813 A | 1/2004 |
| JP | 2004-253967 A | 9/2004 |

OTHER PUBLICATIONS

International Search Report for the Application No. PCT/JP2010/060635 mailed Aug. 3, 2010.
Menezes, A. J. et al., "Handbook of Applied Cryptography", CRC Press, 1997, pp. 497-504.

*Primary Examiner* — Kambiz Zand
*Assistant Examiner* — Benjamin Kaplan
(74) *Attorney, Agent, or Firm* — Renner, Otto, Boisselle & Sklar, LLP

(57) ABSTRACT

The encryption key distribution system includes a node A, a node B, and an authentication server S. Upon receiving a first nonce created by the node A and a second nonce created by the node B, the authentication server S creates a session key. The authentication server S sends a first message authentication code value and a first encryption message to the node A. The first encryption message is created by encrypting the first nonce, the session key, and first additional information with a first secret key. The authentication server S sends a second message authentication code value and a second encryption message to the node B. The second encryption message is created by encrypting the second nonce, the session key, and second additional information with a second secret key. The node A decrypts the first encryption message with the first secret key, thereby obtaining the session key and the first additional information. Further, the node A authenticates the session key by use of the first message authentication code value. The node B decrypts the second encryption message with the second secret key, thereby obtaining the session key and the second additional information. Further, the node B authenticates the session key by use of the second message authentication code value.

7 Claims, 13 Drawing Sheets

(56) References Cited

U.S. PATENT DOCUMENTS

| | | |
|---|---|---|
| 2004/0179690 A1* | 9/2004 | Soliman ........................ 380/277 |
| 2007/0060127 A1* | 3/2007 | Forsberg ....................... 455/436 |
| 2007/0206537 A1* | 9/2007 | Cam-Winget et al. ........ 370/331 |
| 2009/0307496 A1* | 12/2009 | Hahn et al. .................... 713/171 |
| 2011/0071929 A1* | 3/2011 | Morrison ........................ 705/30 |

* cited by examiner

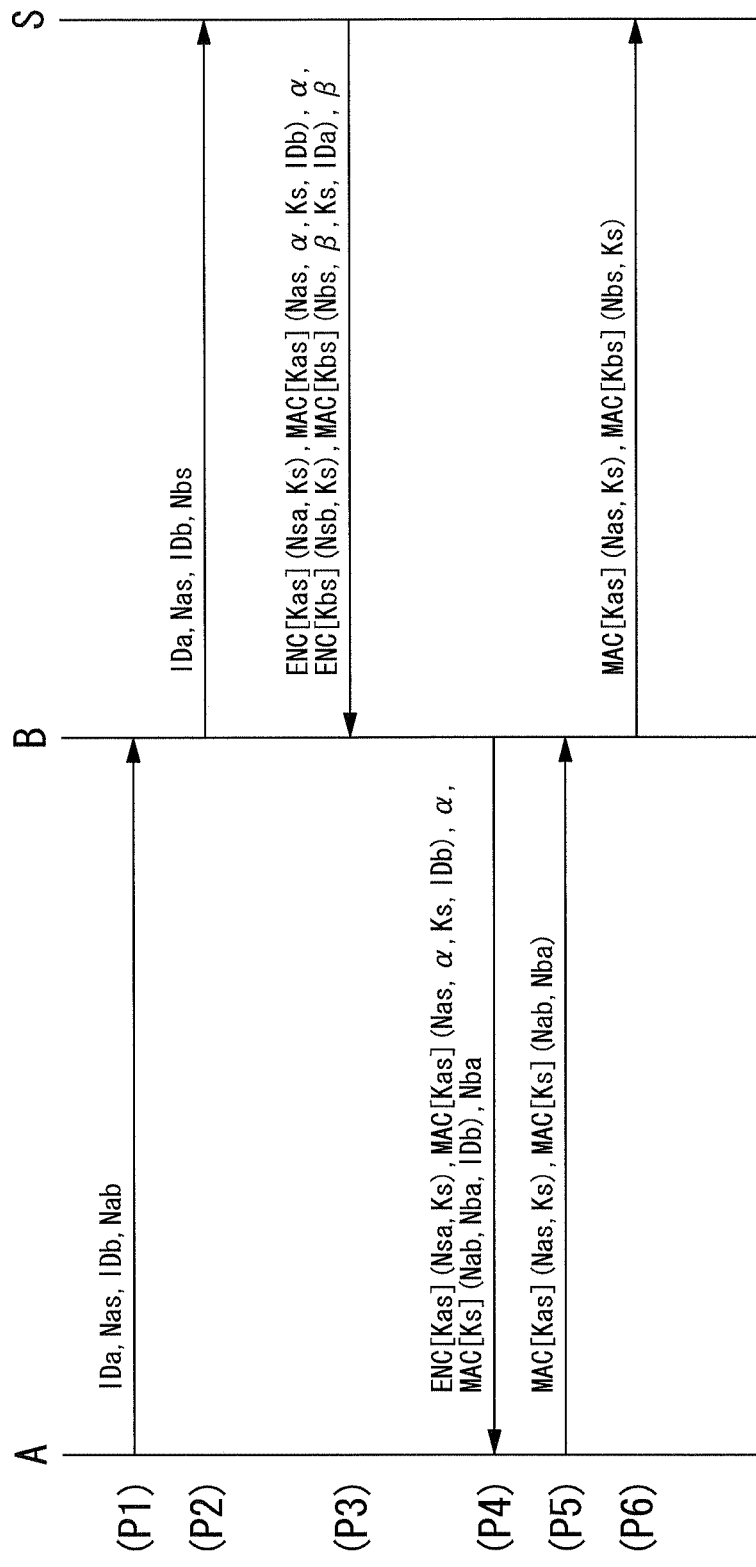

US 8,817,985 B2

ENCRYPTION KEY DISTRIBUTION SYSTEM

TECHNICAL FIELD

The present invention is directed to an encryption key distribution system used for computer communication, the encryption key distribution system being configured to distribute a session key used in communication between nodes from an authentication server to each node.

BACKGROUND ART

Generally, a two party key distribution protocol (2PKDP=2 Party Key Distribution Protocol) and a three party key distribution protocol (3PKDP=3 Party Key Distribution Protocol) are well known as a protocol for distributing session keys (cf. Japanese patent publication 3078841). In the 2PKDP, authentication is established between two nodes, that is, an initiator of communication and a responder of the communication. The 3PKDP is performed by the initiator of the communication, the responder of the communication, and an authentication server as an authenticator.

With regard to the 2PKDP, the node acting as the initiator which starts communication requests the node acting as the responder to provide a session key. In response, the node as the responder provides the session key to the node as the initiator. In this instance, the node as the initiator and the node as the responder share a common secret key preliminarily.

According to the technique of the 2PKDP disclosed in Japanese patent publication 3078841, when requesting provision of the session key, the node as the initiator creates a nonce and sends identification information (e.g., address) of the node as the initiator and the created nonce to the node as the responder. Upon receiving a request of providing the session key from the node as the initiator, the node as the responder creates the session key, and calculates a message authentication code value (MAC value) by use of the secret key from a message including the nonce, the session key, and identification information (e.g. address) of the node as the responder. Further, the node as the responder encrypts the session key and the MAC value, thereby creating an encryption message.

The node as the responder sends the encryption message together with the MAC value to the node as the initiator. The node as the initiator decrypts the encryption message with the secret key, thereby obtaining the session key. Besides, the MAC value is also sent to the node acting as the initiator. Therefore, the node acting as the initiator can check authenticity (i.e., the node acting as the initiator can check whether or not the encryption message is altered by an unauthorized person).

According to the 3PKDP, one of the node as the initiator and the node as the responder relays data from the other to the authentication server, thereby establishing communication between the node and the authentication server. Therefore, the both nodes can share the session key created by the authentication server. With regard to the 3PKDP, a push scenario and a pull scenario have been proposed. According to the push scenario, the node as the initiator directly communicates with the authentication server. According to the pull scenario, the node as the responder directly communicates with the authentication server.

In the push scenario, the node as the initiator communicates with the node as the responder and thereafter communicates with the authentication server, thereby receiving, from the authentication server, an encryption message for the node as the initiator and an encryption message for the node as the responder. Consequently, the node as the initiator obtains the session key from the encryption message for the node as the initiator. The node as the initiator delivers the encryption message for the node as the responder to the node as the responder. Thus, the node as the responder obtains the session key.

By contrast, in the pull scenario, the node as the initiator communicates with the node as the responder. In response, the node as the responder communicates with the authentication server, thereby receiving, from the authentication server, the encryption message for the node as the initiator and the encryption message for the node as the responder. Consequently, the node as the responder obtains the session key from the encryption message for the node as the responder, and delivers the encryption message for the node as the initiator to the node as the initiator. Thus, the node as the initiator obtains the session key.

Irrespective of protocols (push scenario and pull scenario) to be used, the MAC value is sent together with the encryption message including the session key in order to assure the authenticity (the encryption message is not altered). Besides, an encryption message for each node from the authentication server is encrypted or decrypted with a secret key which is shared by the authentication server and each node preliminarily.

Like the node as the responder of the 2PKDP, the authentication server of the 3PKDP calculates the MAC value by use of a secret key from a message including a nonce created by a corresponding node, a session key, and identification information of the corresponding node. The authentication server sends, to the corresponding node, an encryption message created by encrypting a combination of the session key and the MAC value.

FIG. 13 illustrates an instance for the push scenario in the 3PKDP. In the shown instance, a node A is defined as an initiator, and a node B is defined as a responder. In this instance, the node A preliminarily shares a secret key (common key) Kas with an authentication server S, and the node B preliminarily shares a secret key (common key) Kbs with the authentication server S.

First, the node A creates nonces Nas and Nab, and subsequently sends, to the node B, the created nonces Nas and Nab together with identification information IDa of the node A and identification information IDb of the node B (P1). Thereafter, the node B creates a nonce Nbs, and sends, to the authentication server S, the identification information IDb of the node B and the nonce Nbs in addition to the nonce Nas and the identification information IDa received from the node A (P2).

Upon receiving the nonces Nas and Nbs from the node B, the authentication server S creates a session key Ks. Further, the authentication server S calculates, by use of the secret key Kas shared with the node A, a message authentication code value (MAC value) MAC [Kas] (Nas, α, Ks, IDb) from a message containing the nonce Nas, the session key Ks, the identification information IDb of the node B, and predetermined additional information "α". Further, the authentication server S uses the MAC value as a nonce Nsa, and encrypts a combination of the nonce Nsa and the session key Ks, thereby creating an encryption message ENC [Kas] (Nsa, Ks).

Moreover, the authentication server S calculates, by use of the secret key Kbs shared with the node B, a message authentication code value (MAC value) MAC [Kbs] (Nbs, β, Ks, IDa) from a message including the nonce Nbs, the session key Ks, the identification information IDa of the node A, and predetermined additional information "β". Further, the authentication server S uses the MAC value as a nonce Nsb, and encrypts a combination of the nonce Nsb and the session key Ks, thereby creating an encryption message ENC [Kbs] (Nsb, Ks).

The aforementioned additional information "α" is defined as information to be sent to the node A, and the aforementioned additional information "β" is defined as information to be sent to the node B. For example, the additional information indicates an available period of the session key Ks.

The authentication server S sends the two encryption messages including the session key Ks respectively together with the MAC values and the additional information "α" and "β" to the node B (P3). Upon receiving the encryption message from the authentication server S, the node B decrypts the encryption message with the secret key Kbs, and then obtains the nonce Nsb and the session key Ks. The nonce Nsb is identical to the MAC value MAC [Kbs] (Nbs, β, Ks, IDa). Therefore, the node B calculates the MAC value by use of the nonce Nbs and the identification information "β" known to the node B together with the session key Ks and the additional information "β" obtained by the node B. The node B checks whether or not the calculated MAC value is identical to the received MAC value, in order to confirm the authenticity of the encryption message.

Thereafter, the node B transfers, to the node A, the encryption message ENC [Kas] (Nsa, Ks), the MAC value MAC [Kas] (Nas, α, Ks, IDb), and the additional information "α" for the node A which are received from the authentication server S. Further, in order to guarantee that the transfer is performed by the node B, the node B creates a new nonce Nba, and calculates the MAC value MAC [Ks] (Nab, Nba, IDb) based on the session key Ks, and sends, to the node A, the MAC value and the nonce Nba together with the encryption message ENC [Kas] (Nsa, Ks), the MAC value MAC [Kas] (Nas, α, Ks, IDb), and the additional information "α" (P4).

Upon receiving the encryption message ENC [Kas] (Nsa, Ks), the node A decrypts it with the secret key Kas, and then obtains the nonce Nsa and the session key Ks. Moreover, in a similar manner as the node B, the node A calculates the MAC value MAC [Kas] (Nas, α, Ks, IDb), and checks whether or not the calculated MAC value is identical to the received MAC value, in order to confirm the authenticity of the encryption message.

Thereafter, the node A calculates the MAC value MAC [Kas] (Nas, Ks) by use of the secret key Kas, and the MAC value MAC [Ks] (Nab, Nba) by use of the session key Ks, and sends the calculated MAC values to the node B (P5). The node B calculates the MAC value MAC [Ks] (Nab, Nba), and checks whether or not the received MAC values are sent from the node A, on the basis of the calculated MAC value (P5).

Further, the node B calculates the MAC value MAC [Kbs] (Nbs, Ks) by use of the secret key Kbs. The node B sends the calculated MAC value together with the MAC value MAC [Kas] (Nas, Ks) received from the node A to the authentication server S (P6). The authentication server S can check whether or not the received MAC values are sent from the node B, on the basis of these MAC values.

Accordingly, as apparent from the technique of key distribution disclosed in Japanese patent publication 3078841, the node or the authentication server creates the session key, and then, in order to distribute the session key, calculates the MAC value involving the nonce, and encrypts the session key and the MAC value to obtain the encryption message, and sends the obtained encryption message together with the MAC value.

In brief, in line with the teaching of the technique of key distribution disclosed in Japanese patent publication 3078841, the encryption message contains the session key and the MAC value involving the nonce. In the event of sending the additional information unknown to the node receiving the session key, the additional information is sent together with the encryption message and the MAC value without being encrypted.

Therefore, an unauthorized person can sniff the additional information. Especially, in the 3PKDP, either the authentication server or one node relaying the communication obtains the additional information for the other node. Thus, there is a problem that the additional information is not sent in a confidential fashion.

DISCLOSURE OF INVENTION

In view of the above insufficiency, the present invention has been aimed to propose an encryption key distribution system which enables check of authenticity of a session key, yet enabling to encrypt the session key together with additional information other than the session key and distribute the same.

The encryption key distribution system in accordance with the present invention includes a first node, a second node, and an authentication server. The authentication server is configured to create a session key used for encryption communication between the first node and the second node. The first node and the authentication server are configured to retain a first secret key used for encryption communication between the first node and the authentication server. The second node and the authentication server are configured to retain a second secret key used for encryption communication between the second node and the authentication server. The first node is configured to create a first nonce and sends the created first nonce to the authentication server when the first node requests the authentication server to issue the session key. The second node is configured to create a second nonce and sends the created second nonce to the authentication server when the second node requests the authentication server to issue the session key. The authentication server is configured to: newly create the session key in response to receiving the first nonce and the second nonce; and calculate a first message authentication code value by use of the first secret key from a first message including the received first nonce, the newly created session key, and predetermined first additional information; and create a first encryption message by encrypting the received first nonce, the newly created session key, and the first additional information with the first secret key; and send the first encryption message and the first message authentication code value to the first node; and calculate a second message authentication code value by use of the second secret key from a second message including the received second nonce, the newly created session key, and predetermined second additional information; and create a second encryption message by encrypting the received second nonce, the newly created session key, and the second additional information with the second secret key; and send the second encryption message and the second message authentication code value to the second node. The first node is configured to: in response to receiving the first encryption message and the first message authentication code value, obtain the session key and the first additional information by decrypting the first encryption message with the first secret key; and calculate the first message authentication code value by use of the first nonce stored in the first node, the session key and the first additional information obtained by decrypting the first encryption message, and the first secret key; and authenticate the session key received from the authentication server by judging whether or not the first message authentication code value calculated by the first node is equal to the first message authentication code value received from the authentication server. The second node is configured to: in response to receiving the second encryption message and the second message authentication code value, obtain the session key and the second additional information by decrypting the second encryption message with the second secret key; and calculate the second message authentication code value by use of the second nonce stored in the second node, the session key and the second additional information obtained by decrypting the second encryption message, and the second secret key; and authenticate the session key received from the authentication server by judging whether or not the second message authentication code value calculated by the second node is equal to the second message authentication code value received from the authentication server.

In a preferred aspect, the first additional information and the second additional information are defined as authorization information regarding access control.

In a preferred aspect, the authentication server is configured to, upon receiving request information regarding the access control from the first node or the second node, compare the received request information regarding the access control with registration information regarding the access control preliminarily registered. The authentication server is configured to, upon acknowledging that the registration information regarding the access control does not include the received request information regarding the access control, use the registration information of the access control as the authorization information regarding the access control.

In a more preferred aspect, the encryption key distribution system further comprises a proxy node configured to relay communication between the first node and the second node. The authentication server is configured to send the authorization information regarding the access control to the proxy node. The proxy node is configured to relay the communication between the first node and the second node on the basis of the authorization information regarding the access control received from the authentication server.

In the more preferred aspect, further, the first node and the second node have a group identifier. The first additional information and the second additional information include the group identifier. The proxy node is configured to execute the access control by use of the group identifier.

In a more preferred aspect, the authentication server is configured to create the authorization information regarding the access control on the basis of changeable registration information regarding the access control.

In a more preferred aspect, the authentication server is configured to, upon receiving the request information regarding the access control from the first node or the second node, perform a logical operation of the received request information regarding the access control and registration information regarding the access control preliminarily registered, thereby creating the authorization information regarding the access control.

BRIEF DESCRIPTION OF DRAWINGS

FIG. 13 is an explanatory diagram illustrating the operation of the 3 party key distribution protocol of the prior art.

BEST MODE FOR CARRYING OUT THE INVENTION

As explained in Background Art, the 2PKDP (2 Party Key Distribution Protocol) performed by two parties, and the 3PKDP (3 Party Key Distribution Protocol) performed by three parties are known as a technique of authentication and distribution of a session key. The embodiments as explained below, indicate an instance that the technical concept of the present invention is applied to the 3PKDP, but the technical concept of the present invention can be applied to the following 2PKDP. Besides, each of an authentication server and a node as explained below is realized by use of a computer having a communication function, and is configured to communicate with others via a wide area information network (e.g., the Internet) or a local information network.

(1) 2PKDP

Figure 10:
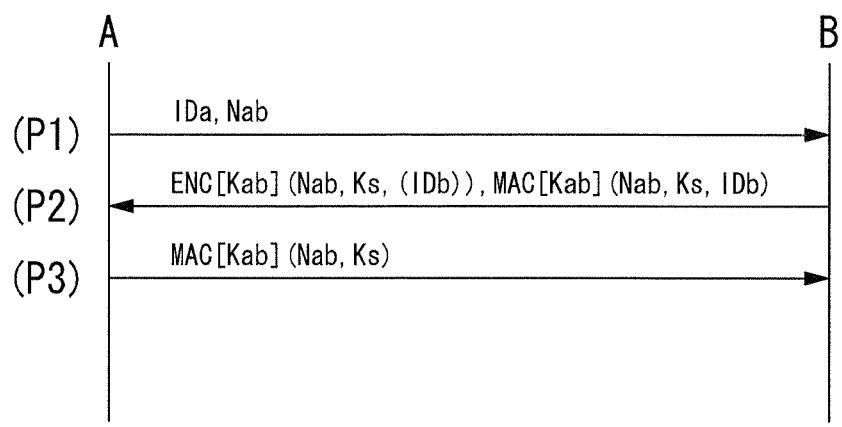
FIG. 10 is an explanatory diagram illustrating the operation of the 2 party key distribution protocol in accordance with the present invention.

First, an explanation is made to a basic procedure of the 2PKDP with reference to an instance where two nodes A and B shares a session key Ks, as shown in FIG. 10. In this instance, the node A requests the node B to provide the session key Ks, and the node B provides the session key Ks to the node A. Further, the node B is configured to distribute the session key Ks, and the node A is configured to request distribution of the session key Ks. The nodes A and B share a common secret key (namely, a common key) Kab preliminarily. In other words, the node B functions as a communication partner of the node A as well as an authentication server for the node A.

Besides, instead of an instance where the nodes A and B share the common secret key Kab, the node B distributing the session key Ks may preliminarily possess the secret key Kab retained by the node A in association with identification information (e.g., an address) IDa of the node A requesting the distribution of the session key Ks.

In order to request the distribution of the session key Ks, the node A creates the nonce Nab, and then sends a nonce Nab and the identification information IDa of the node A to the node B (P1).

Upon receiving the request of key distribution from the node A, the node B creates the session key Ks. Further, the node B encrypts a combination of the nonce Nab and the session key Ks with the secret key Kab, thereby creating an encryption message ENC [Kab] (Nab, Ks). In addition, the node B calculates, by use of the secret key Kab of the node A, a message authentication code value (MAC value) MAC [Kab] (Nab, Ks, IDb). Thereafter, the node B sends the encryption message together with the MAC value to the node A (P2).

Upon receiving the information sent from the node B, the node A obtains the nonce Nab, the session key Ks, the identification information (e.g., an address) IDb of the node B by use of the secret key Kab. Further, the node A calculates the MAC value MAC [Kab] (Nab, Ks) based on the secret key Kab, and sends the calculated MAC value to the node B (P3).

Upon receiving the MAC value MAC [Kab] (Nab, Ks) from the node A, the node B calculates the MAC value by use of the secret key Kab from a message including the nonce Nab, and the session key Ks which are known to the node B. Thereafter, the node B compares the calculated MAC value with the MAC value received from the node A. Thus, the node B checks whether or not the session key Ks is successfully sent to the node A in a confidential manner.

For example, the encryption message ENC [Kab] (Nab, Ks) involving the session key Ks may be defined as the exclusive logical sum of the session key Ks and a message. The message is obtained by encrypting, with the secret key Kab, a result calculated from a predetermined one-way function regarding the nonce Nab. Besides, the node B may encrypt the session key Ks together with the identification information IDb of the node B.

(2) 3PKDP

Figure 11:
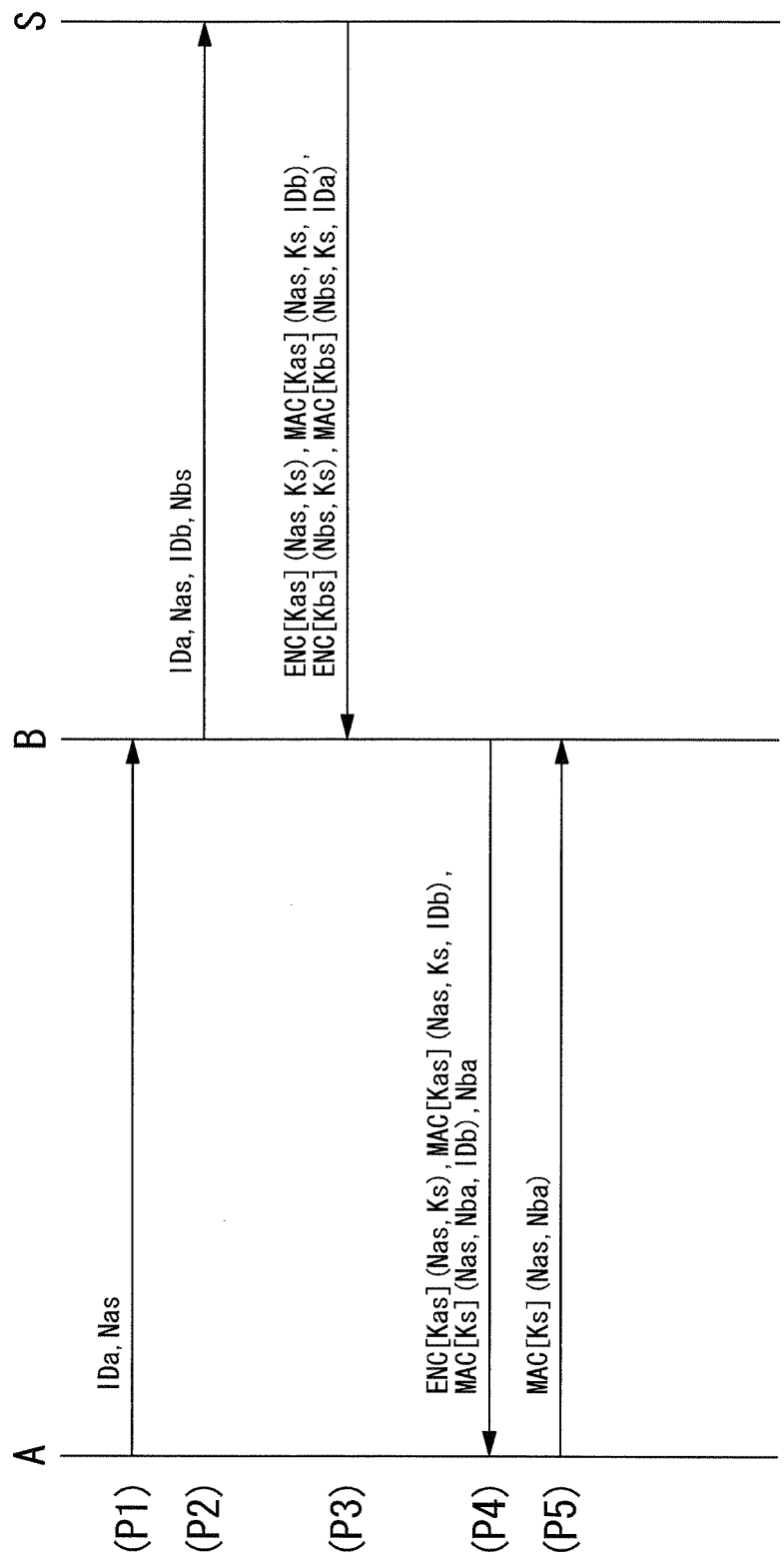
FIG. 11 is an explanatory diagram illustrating the operation of the 3 party key distribution protocol in accordance with the present invention.

Next, an explanation is made to a basic procedure of the 3PKDP with reference to an instance where, in a system including two nodes A and B and one authentication server S, the authentication server S distributes the session key Ks used for communication between the two nodes A and B, as shown in FIG. 11. In this instance, the nodes A and B preliminarily share common secret keys (common keys) Kas and Kbs with the authentication server S, respectively.

However, as already mentioned regarding the 2PKDP, instead of the instance where the nodes A and B share the common secret keys Kas and Kbs with the authentication server S respectively, the authentication server S may preliminarily possess information associating the address information of the nodes A and B with the secret keys Kas and Kab respectively.

The operation instance shown in FIG. 11 illustrates that the node A acts as an initiator of communication and the node B as an responder relays communication between the node A and the authentication server S. Therefore, the session key Ks issued by the authentication server S is delivered to the node A via the node B.

In this operation instance, the node A first creates a nonce Nas for the authentication server S, and sends the identification information IDa of the node A and the nonce Nas to the node B (P1).

Upon receiving the nonce Nas from the node A, the node B creates a nonce Nbs, and sends, to the authentication server S, the identification information IDb of the node B and the nonce Nbs in addition to the identification information IDa and the nonce Nas received from the node A (P2).

Upon receiving the identification information IDa and IDb and the nonces Nas and Nbs from the node B, the authentication server S creates the session key Ks. Further, the authentication server S encrypts a combination of the nonce Nas and the session key Ks with the secret key Kas corresponding to the node A, thereby creating an encryption message ENC [Kas] (Nas, Ks). Moreover, the authentication server S encrypts a combination of the nonce Nbs and the session key Ks with the secret key Kbs corresponding to the node B, thereby creating an encryption message ENC [Kbs] (Nbs, Ks).

Additionally, the authentication server S calculates a MAC value MAC [Kas] (Nas, Ks, IDb) by use of the secret key Kas in association with the node A, and further calculates a MAC value MAC [Kbs] (Nbs, Ks, IDa) by use of the secret key Kbs in association with the node B. The two encryption messages obtained by encrypting the session key Ks in the authentication server S are attached with the corresponding MAC values, respectively, and then are sent to the node B (P3).

Upon receiving the encryption message ENC [Kbs] (Nbs, Ks) from the authentication server S, the node B obtains the nonce Nbs and the session key Ks by decrypting the received encryption message with the secret key Kbs. Further, the node B checks the authenticity of the session key Ks by use of the MAC value.

Further, the node B transfers, to the node A, the encryption message ENC [Kas] (Nas, Ks) and the MAC value MAC [Kas] (Nas, Ks, IDb) for the node A from the authentication server S. In this procedure, in order to guarantee that the transfer thereof is performed by the node B, the node B creates a new nonce Nba, and calculates the MAC value MAC [Ks] (Nas, Nba, IDb) based on the session key Ks, and sends, to the node A, the MAC value and the nonce Nba together with the encryption message ENC [Kas] (Nsa, Ks) and the MAC value MAC [Kas] (Nas, Ks, IDb) (P4).

Upon receiving the encryption message ENC [Kas] (Nas, Ks) from the node B, the node A decrypts it with the secret key Kas, and then obtains the nonce Nas and the session key Ks. Further, the node A checks whether or not the session key Ks has issued by the authentication server S and has sent via the node B, on the basis of the MAC value.

The node A receiving the session key Ks calculates the MAC value MAC [Ks] (Nas, Nba) based on the session key Ks, and sends the same to the node B (P5). The node B can judge whether or not the node A has succeeded in reception of the session key Ks, by use of the MAC value MAC [Ks] (Nas, Nba).

In the above operation instance, the encryption message ENC [Kas] (Nas, Ks) obtained by encrypting the session key Ks may be the exclusive logical sum of the session key Ks and a message obtained by encrypting, with the secret key Kas, a result calculated from a predetermined one-way function regarding the nonce Nas. Further, the encryption message ENC [Kbs] (Nbs, Ks) obtained by encrypting the session key Ks may be the exclusive logical sum of the session key Ks and a message obtained by encrypting, with the secret key Kbs, a result calculated from a predetermined one-way function regarding the nonce Nbs.

Figure 12:
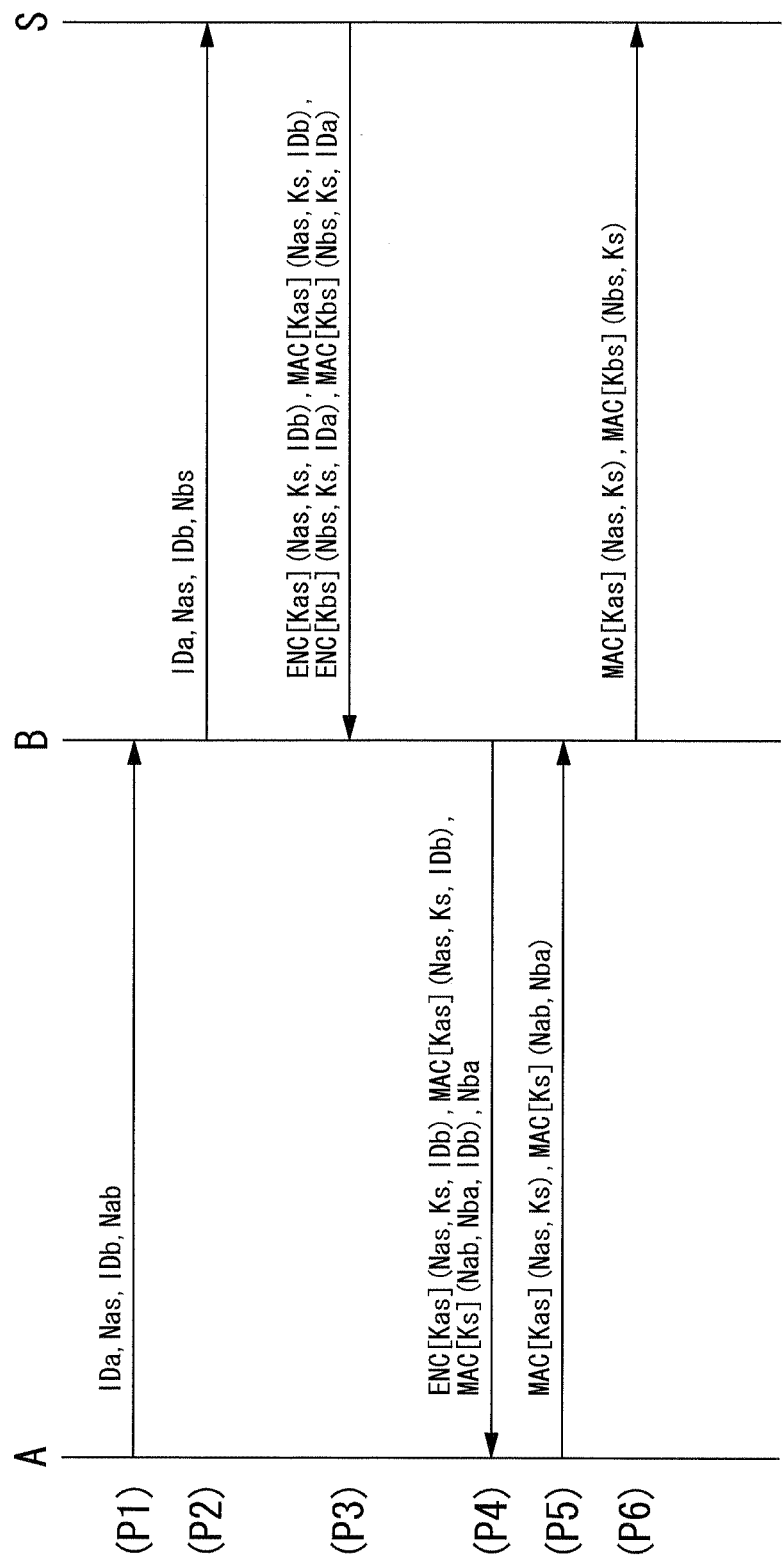
FIG. 12 is an explanatory diagram illustrating the operation of a modified example of the 3 party key distribution protocol in accordance with the present invention.

In the above procedures P1 to P5, various data can be attached to the communication message as an option. FIG. 12 illustrates an operation instance where options are attached to the communication message. In the illustrated instance, first, with regard to the procedure P1 of sending the nonce Nas from the node A to the node B, the identification information IDb of the node B and the nonce Nab of the node A to the node B are attached to the communication message sent to the node B from the node A.

Further, with regard to the procedure P3 of sending the encryption message including the session key Ks from the authentication server S to the node B, and the procedure P4 of sending the encryption message including the session key Ks from the node B to the node A, the encryption message is created by encrypting the message including the identification information IDa or IDb of the node A or B as a communication partner thereof. In brief, the identification information IDb of the node B is incorporated in the encryption message to be received by the node A, and the identification information IDa of the node A is incorporated in the encryption message to be received by the node B.

In addition, with regard to the procedure P5 of sending an acknowledgement from the node A to the node B, the MAC value MAC [Kas] (Nas, Ks) based on the secret key Kas for the authentication server S is sent in addition to the MAC value MAC [Ks] (Nas, Nba) for the node B.

Upon receiving the acknowledgement, the node B calculates the MAC value MAC [Kbs] (Nbs, Ks) based on the secret key Kbs, and sends, to the authentication server S, the MAC value MAC [Kbs] (Nbs, Ks) in addition to the MAC value MAC [Kas] (Nas, Ks) based on the secret key Kas received from the node A (P6). The authentication server S receives these MAC values from the node B and verifies them in order to determine whether or not the nodes A and B have succeeded in reception of the session key Ks.

In the following embodiments, various operation instances are explained based on the operation instances illustrated in FIGS. 11 and 12 with regard to the authentication of the secret key performed among three parties. Besides, the operation instances as explained below can be applied to the 2PDKP in consideration of a relation between the operation of FIG. 11 or 12 and the operation of FIG. 10. For example, in the 2PDKP, the node B functions as the authentication server S, too. In other words, the processing of the authentication server S is performed by the node B. Further, in view of a relation between the operation of FIG. 12 and the operation of FIG. 11, the operation explained based on the procedures illustrated in FIG. 12 also can be modified to an operation devoid of the options indicated by the operation of FIG. 12.

First Embodiment

In this embodiment, an explanation is made to an instance which performs, in addition to the basic operation illustrated in FIG. 11, an operation of sending additional information "α" and "β" respectively for the nodes A and B in the distribution of the session key Ks to each of the nodes A and B. The additional information "α" and "β" is encrypted and transmitted in a similar manner as the distribution of the session key Ks.

For example, the additional information "α" and "β" may include at least one of the available period of the session key Ks, the number of times of communication using the session key Ks (the number of times of access), and charging information for enjoying a service via communication using the session key Ks.

With regard to the available period of the session key Ks, the additional information "α" and "β" include a time stamp indicative of the time of distributing the session key Ks and the available period thereof. In this instance, the session key Ks is invalidated after a lapse of the available period from the time indicated by the time stamp. Like the available period of the session key Ks, the number of times of access defines a length of life of the session key Ks. In this situation, the additional information "α" and "β" include the available number of times of communication using the session key Ks. The session key Ks is invalidated when the number of times of communication using the session key Ks exceeds the available number of times.

The charging information may be a charging amount. In this instance, upon receiving the charging amount as the additional information "α" and "β", the nodes A and B compare the charging amount with their own budgets to determine whether or not establishment of communication using the session key Ks is performed, respectively. Besides, with using the additional information "α" and "β" including the available period of the session key Ks and the charging amount, it is possible to announce the charging amount at the time of termination of the available period.

The additional information "α" and "β" can be used for the other purpose. The use of the additional information "α" and "β" may be determined in consideration of an operation of the system constructed by use of the nodes A and B.

Figure 2:
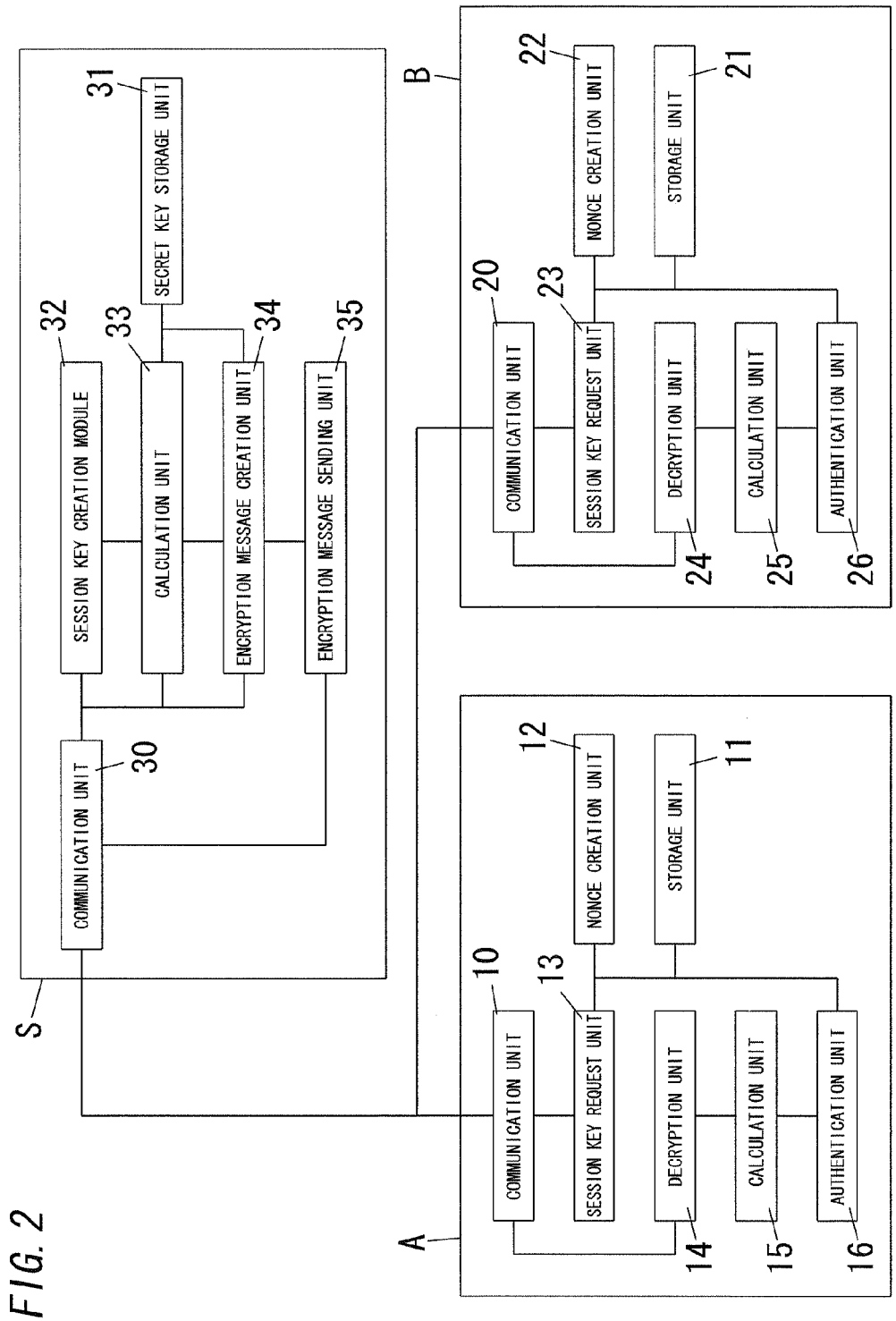
FIG. 2 is a diagram illustrating configuration of the above encryption key distribution system.

As shown in FIG. 2, the encryption key distribution system of the present embodiment includes a node (first node) A, a node (second node) B, and an authentication server S. The authentication server S is configured to create a session key used for encrypted communication between the nodes A and B.

The node A includes a communication unit (first communication unit) 10, a storage unit (first storage unit) 11, a nonce creation unit (first nonce creation unit) 12, and a session key request unit (first session key request unit) 13.

The communication unit 10 is configured to communicate with the authentication server S and the node B via an information network.

The storage unit 11 is configured to store a secret key (first secret key) Kas. Further, the storage unit 11 is configured to store identification information IDa of the node A.

The nonce creation unit 12 is configured to create a nonce (first nonce) Nas.

The session key request unit 13 is configured to control the nonce creation unit 12 in such a manner to create the first nonce Nas when requesting the authentication server S to issue the session key Ks. The session key request unit 13 is configured to, in response to creation of the first nonce Nas by the nonce creation unit 12, store the first nonce Nas created by the nonce creation unit 12 in the storage unit 11. The first nonce Nas is stored in the storage unit 11 until the end of the procedure where the node A receives the session key Ks from the authentication server S.

Further, the session key request unit 13 is configured to, in response to the creation of the first nonce Nas by the nonce creation unit 12, control the communication unit 10 in such a manner to send the first nonce Nas created by the nonce creation unit 12 to the authentication server S.

In the present embodiment, the session key request unit 13 is configured to send, to the authentication server S via the node B, the first nonce Nas created by the nonce creation unit 12 and the identification information IDa stored in the storage unit 11. In brief, the session key request unit 13 is configured to send, to the node B, the first nonce Nas created by the nonce creation unit 12 and the identification information IDa stored in the storage unit 11.

The node B includes a communication unit (second communication unit) 20, a storage unit (second storage unit) 21, a nonce creation unit (second nonce creation unit) 22, and a session key request unit (second session key request unit) 23.

The communication unit 20 is configured to communicate with the authentication server S and the node A via the information network.

The storage unit 21 is configured to store a secret key (second secret key) Kbs. Further, the storage unit 21 is configured to store identification information IDb of the node B.

The nonce creation unit 22 is configured to create a nonce (second nonce) Nbs.

The session key request unit 23 is configured to control the nonce creation unit 22 in such a manner to create the second nonce Nbs when requesting the authentication server S to issue the session key Ks. The session key request unit 23 is configured to, in response to creation of the second nonce Nbs by the nonce creation unit 22, store the second nonce Nbs created by the nonce creation unit 22 in the storage unit 21. The second nonce Nbs is stored in the storage unit 21 until the end of the procedure where the node B receives the session key Ks from the authentication server S.

Further, the session key request unit 23 is configured to, in response to the creation of the first nonce Nbs by the nonce creation unit 22, control the communication unit 20 in such a manner to send the second nonce Nbs created by the nonce creation unit 22 to the authentication server S.

In the present embodiment, the session key request unit 23 is configured to, upon receiving the first nonce Nas and the identification information IDa from the node A, send, to the node B, the second nonce Nbs created by the nonce creation unit 22 and the identification information IDb stored in the storage unit 21 in addition to the first nonce Nas and the identification information IDa received from the node A.

The authentication server S includes a communication unit (third communication unit) 30, a secret key storage unit 31, a session key creation unit 32, a calculation unit (third calculation unit) 33, an encryption message creation unit 34, and an encryption message sending unit 35.

The communication unit 30 is configured to communicate with the nodes A and B via the information network.

The secret key storage unit 31 is configured to store a secret key (first secret key) Kas of the node A and a secret key (second secret key) Kbs of the node B. In particular, the secret key storage unit 31 stores a key database indicative of a correspondence relation between identification information and the corresponding secret key for each node. For example, the secret key Kas is associated with the identification information IDa concerning the node A, and the secret key Kbs is associated with the identification information IDb concerning the node B.

Thus, the node A and the authentication server S share the first secret key Kas used for the encrypted communication between the node A and the authentication server S. Further, the node B and the authentication server S share the second secret key Kbs used for the encrypted communication between the node B and the authentication server S.

The session key creation unit 32 is configured to newly create the session key Ks when the communication unit 30 receives the first nonce Nas and the second nonce Nbs.

The calculation unit 33 is configured to calculate a message authentication code value (first message authentication code value) MAC [Kas] (Nas, α, Ks, IDb) by use of the first secret key Kas stored in the secret key storage unit 31 together with a message (first message) containing the first nonce Nas received by the communication unit 30, the session key Ks newly created by the session key creation unit 32, and predetermined first additional information "α". In the present embodiment, the first message includes the first nonce Nas, the session key Ks, the first additional information "α", and the identification information IDb of the node B communicating with the node A.

In addition, the calculation unit 33 is configured to calculate a message authentication code value (second message authentication code value) MAC [Kbs] (Nbs, β, Ks, IDa) by use of the second secret key Kbs stored in the secret key storage unit 31 together with a message (second message) containing the second nonce Nbs received by the communication unit 30, the session key Ks newly created by the session key creation unit 32, and predetermined second additional information "β". In the present embodiment, the second message includes the second nonce Nbs, the session key Ks, the second additional information "β", and the identification information IDa of the node A communicating with the node B.

The encryption message creation unit 34 is configured to encrypt a combination of the first nonce Nas received by the communication unit 30, the session key Ks newly created by the session key creation unit 32, and the first additional information "α" with the first secret key Kas stored in the secret key storage unit 31 so as to create an encryption message (first encryption message) ENC [Kas] (Nas, α, Ks). Further, the encryption message creation unit 34 is configured to encrypt a combination of the second nonce Nbs received by the communication unit 30, the session key Ks newly created by the session key creation unit 32, and the second additional information "β" with the second secret key Kbs stored in the secret key storage unit 31 so as to create an encryption message (second encryption message) ENC [Kbs] (Nbs, β, Ks).

The encryption message sending unit 35 is configured to control the communication unit 30 in such a manner to send, to the node A, the first encryption message ENC [Kas] (Nas, α, Ks) created by the encryption message creation unit 34 and the first message authentication code value MAC [Kas] (Nas, α, Ks, IDb) created by the calculation unit 33. Moreover, the encryption message sending unit 35 is configured to control the communication unit 30 in such a manner to send, to the node B, the second encryption message ENC [Kbs] (Nbs, β, Ks) created by the encryption message creation unit 34 and the second message authentication code value MAC [Kbs] (Nbs, β, Ks, IDa) created by the calculation unit 33.

The node A further includes a decryption unit (first decryption unit) 14, a calculation unit (first calculation unit) 15, and an authentication unit (first authentication unit) 16.

The decryption unit 14 is configured to, upon receiving the first encryption message ENC [Kas] (Nas, α, Ks) and the first message authentication code value MAC [Kas] (Nas, α, Ks, IDb) via the communication unit 10, decrypt the first encryption message ENC [Kas] (Nas, α, Ks) with the first secret key Kas stored in the storage unit 11 in order to obtain the first nonce Nas, the session key Ks, and the first additional information "α".

The calculation unit 15 is configured to calculate the first message authentication code value MAC [Kas] (Nas, α, Ks, IDb) by use of the first nonce Nas stored in the storage unit 11, the session key Ks and the first additional information "α" obtained by decrypting the first encryption message ENC [Kas] (Nas, α, Ks) by the decryption unit 14, and the first secret key Kas stored in the storage unit 11.

The authentication unit 16 is configured to determine whether or not the first message authentication code value MAC [Kas] (Nas, α, Ks, IDb) calculated by the calculation unit 15 is equal to the first message authentication code value MAC [Kas] (Nas, α, Ks, IDb) received from the authentication server S, in order to authenticate the session key Ks received from the authentication server S.

The authentication unit 16 is configured to, upon determining that the first message authentication code value MAC [Kas] (Nas, α, Ks, IDb) calculated by the calculation unit 15 is not equal to the first message authentication code value MAC [Kas] (Nas, α, Ks, IDb) received from the authentication server S, judge that the session key Ks is invalid. Upon judging that the session key Ks is invalid, for example, the authentication unit 16 discards the session key Ks.

The authentication unit 16 is configured to, upon determining that the first message authentication code value MAC

[Kas] (Nas, α, Ks, IDb) calculated by the calculation unit 15 is equal to the first message authentication code value MAC [Kas] (Nas, α, Ks, IDb) received from the authentication server S, judge that the session key Ks is valid. For example, the authentication unit 16 is configured to store the session key Ks received from the authentication server S in the storage unit 11 upon judging that the session key Ks is valid.

Besides, the authentication unit 16 is configured to compare the first nonce Nas obtained by the decryption unit 14 with the first nonce Nas stored in the storage unit 11. The authentication unit 16 is configured to, upon acknowledging that the first nonce Nas obtained by the decryption unit 14 is not equal to the first nonce Nas stored in the storage unit 11, decide not to authenticate the session key Ks.

As described in the above, the communication unit 10 is configured to, when the node A acquires the session key Ks from the authentication server 5, use the session key Ks received from the authentication server S in order to encrypt data to be sent to the node B and decrypt a message (data) received from the node B in the procedure of communicating with the node B.

The node B further includes a decryption unit (second decryption unit) 24, a calculation unit (second calculation unit) 25, and an authentication unit (second authentication unit) 26.

The decryption unit 24 is configured to, upon receiving the second encryption message ENC [Kbs] (Nbs, β, Ks) and the second message authentication code value MAC [Kbs] (Nbs, β, Ks, IDa) via the communication unit 20, decrypt the second encryption message ENC [Kbs] (Nbs, β, Ks) with the second secret key Kbs stored in the storage unit 21 in order to obtain the second nonce Nbs, the session key Ks, and the second additional information "β".

The calculation unit 25 is configured to calculate the second message authentication code value MAC [Kbs] (Nbs, β, Ks, IDa) by use of the second nonce Nbs stored in the storage unit 21, the session key Ks and the second additional information "β" obtained by decrypting the second encryption message ENC [Kbs] (Nbs, β, Ks) by the decryption unit 24, and the second secret key Kbs stored in the storage unit 21.

The authentication unit 26 is configured to determine whether or not the second message authentication code value MAC [Kbs] (Nbs, β, Ks, IDa) calculated by the calculation unit 25 is equal to the second message authentication code value MAC [Kbs] (Nbs, β, Ks, IDa) received from the authentication server S, in order to authenticate the session key Ks received from the authentication server S.

The authentication unit 26 is configured to, upon determining that the second message authentication code value MAC [Kbs] (Nbs, β, Ks, IDa) calculated by the calculation unit 25 is not equal to the second message authentication code value MAC [Kbs] (Nbs, β, Ks, IDa) received from the authentication server S, judge that the session key Ks is invalid. Upon judging that the session key Ks is invalid, for example, the authentication unit 26 discards the session key Ks.

The authentication unit 26 is configured to, upon determining that the second message authentication code value MAC [Kbs] (Nbs, β, Ks, IDa) calculated by the calculation unit 25 is equal to the second message authentication code value MAC [Kbs] (Nbs, β, Ks, IDa) received from the authentication server S, judge that the session key Ks is valid. For example, the authentication unit 26 is configured to store the session key Ks received from the authentication server S in the storage unit 21 upon judging that the session key Ks is valid.

Besides, the authentication unit 26 is configured to compare the second nonce Nbs obtained by the decryption unit 24 with the second nonce Nbs stored in the storage unit 21. The authentication unit 26 is configured to, upon acknowledging that the second nonce Nbs obtained by the decryption unit 24 is not equal to the second nonce Nbs stored in the storage unit 21, decide not to authenticate the session key Ks.

As described in the above, the communication unit 10 is configured to, when the node B acquires the session key Ks from the authentication server S, use the session key Ks received from the authentication server S in order to encrypt data to be sent to the node A and decrypt a message (data) received from the node A in the procedure of communicating with the node A.

In an operation instance as explained below, the node A is treated as an initiator (subject) of communication, and the node B is treated as a responder (object) of communication. With regard to the node A as the subject and the node B as the object, when communication by use of the encryption message is allowed as a result of distribution of the session key Ks, the subject (node A) can control the object (node B).

In order that the node A as the subject and the node B as the object communicate with each other by use of an encryption message, the node A and B need to obtain a secret key (session key Ks) common to the nodes A and B from the authentication server S and use the session key Ks for encryption of a message.

When the nodes A and B request reception of the session key Ks from the authentication server S, first the node A sends the identification information IDa of the node A and the nonce Nas to the node B in a similar manner as the operation illustrated in FIG. 11 (P1).

Figure 3:
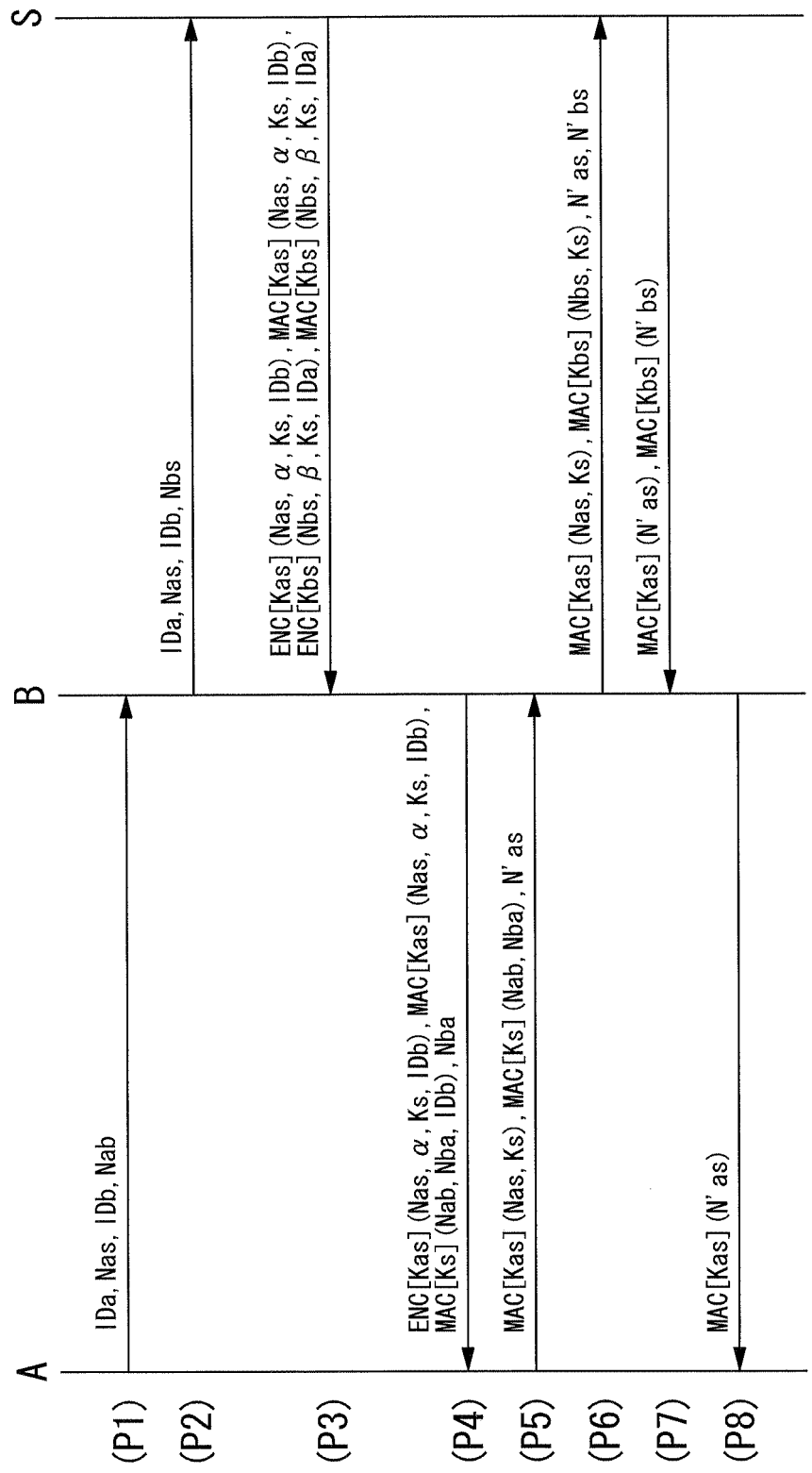
FIG. 3 is an explanatory diagram illustrating the operation of a modified example the above encryption key distribution system.

At least one of the identification information IDb of the node B and the nonce Nab created for the node B may be attached, as an option, to the communication message sent from the node A to the node B (see FIG. 3). The nonce Nas and the nonce Nab are created (by the nonce creation unit 12) each time the node A requests the distribution of the session key Ks, and are temporarily stored (in the storage unit 11) until the end of the distribution procedure of the session key Ks.

An instance where the node A establishes multicast communication is explained as an instance where the node A adds the identification information IDb of the node B to the message as the option. In the instance where the node A establishes multicast communication, nodes other than the node B also receives the message from the node A. Therefore, in order to distinguish the node B from the other nodes and to have only the node B receive the message, the identification information IDb of the node B is used as the option.

The nonce Nas is used by the node A for checking the validity of the response from the authentication server S, and is also used in the procedure of confirming the session key Ks between the nodes A and B. Therefore, the procedure can be simplified. However, in view of improving the security of the key distribution, a different nonce is preferred to be used for each communication process.

As a general rule, the nonce is used only one time. Ideally, the same nonce is not sent repeatedly. However, there is a possibility that the same nonce is sent again due to a failure of communication path or the nodes A and B. Therefore, a replay attack may cause a failure in the key distribution. In order to give a safeguard against the replay attack and improve the security of the key distribution, it is preferred to create the nonce Nab between the nodes A and B in a process of checking the session key Ks, in addition to the nonce Nas that the node A uses for checking the validity of the response from the authentication server S. In brief, the nonce (Nab, Nas) is preferred to be newly created for each communication process.

Upon receiving the message of the procedure P1 from the node A, the node B obtains the identification information IDa of the node A and the nonce Nas (in the optional instance, the node B further obtains the identification information IDb of the node B and the nonce Nab), and creates the nonce Nbs. Further, the node A sends, to the authentication server S, the message including the identification information IDb of the node B and the nonce Nbs in addition to the identification information IDa of the node A and the nonce Nas (when the option is added, also the identification information IDb of the node B and the nonce Nab are included in the message) (P2). The nonce Nbs is created (by the nonce creation unit 22) each time the node B requests the authentication server S to issue the session key Ks, and is stored (in the storage unit 21) until the end of the procedure of distributing the session key Ks. The procedures P1 and P2 are substantially same as the basic procedures of the 3PKDP illustrated in FIG. 11.

Upon receiving the message of the procedure P2 from the node B, the authentication server S creates the session key Ks which the nodes A and B use for communicating. The authentication server S includes the key database (not shown) storing the correspondence relation between the identification information IDa of the node A and the secret key Kas and the correspondence relation between the identification information IDb of the node B and the secret key Kbs. Upon receiving the message of requesting the key distribution from the node B, the authentication server S searches the key database with regard to each of the identification information IDa of the node A and the identification information IDb of the node B obtained from the message, and obtains the secret keys Kas and Kbs respectively corresponding to the nodes A and B.

In addition, the authentication server S creates the encryption message ENC [Kas] (Nas, α, Ks) by encrypting the nonce Nas created by the node A, the additional information "α", and the session key Ks with the secret key Kas corresponding to the node A, and the encryption messages ENC [Kbs] (Nbs, β, Ks) by encrypting the nonce Nbs created by the node B, the additional information "β", and the session key Ks with the secret key Kbs corresponding to the node B. Further, the authentication server S creates the MAC value MAC [Kas] (Nas, α, Ks, IDb) based on the secret key Kas corresponding to the node A for the corresponding message, and creates the MAC value MAC [Kbs] (Nbs, β, Ks, IDa) based on the secret key Kbs corresponding to the node B for the corresponding message.

A set of the encryption message ENC [Kas] (Nas, α, Ks) and the MAC value" is defined as data to be sent for the node A via the node B. A set of the encryption message ENC [Kbs] (Nbs, β, Ks) and the MAC value MAC [Kbs] (Nbs, β, Ks, IDa) is defined as data to be sent for the node B. Arrangement of data is preliminarily determined such that each of nodes A and B can receive a corresponding data. In the present embodiment, the former set is defined as data to be sent to the node A, and the latter set is defined as data to be sent to the node B. The data created by the authentication server S in the aforementioned manner is sent to the node B (P3).

When the authentication server S creates the messages respectively for the nodes A and B by encrypting the session key Ks distributed to the nodes A and B, the authentication server S may include, in the message for the node A, the identification information IDb of the node B which the node A communicates with by use of the session key Ks, as an option. Further, the authentication server S may include, in the message for the node B, the identification information IDa of the node A which the node B communicates with by use of the session key Ks, as an option (see FIG. 3). In brief, the authentication server S treats the encryption message ENC [Kas] (Nas, α, Ks, IDb) as the message for the node A, and further treats the encryption message ENC [Kbs] (Nbs, β, Ks, IDa) as the message for the node B.

With including the option in the communication message, the node A can request the key distribution without preliminarily knowing the identification information IDb of the node B. In brief, the node A can know the identification information IDb of the node B as the communication partner by receiving the message including the session key Ks from the authentication server S. Moreover, the node A can judge whether or not the communication partner is proper, on the basis of the identification information IDb, and thus determine whether or not the node A continues the communication process, on the basis of the result of the judgment. Further, it is possible to confirm the identification information IDa and IDb of the communication partner to which the authentication server S distributes the session key Ks. Therefore, the node A can check the identification information IDb of the communication partner thereof, and the node B can check the identification information IDa of the communication partner thereof. Consequently, it is possible to judge whether or not at least one of the message for the node B from the node A and the message for the node A from the node B is falsified.

Upon receiving the data indicated by the procedure P3 from the authentication server S, the node B extracts the encryption message set (the set of the encryption message ENC [Kbs] (Nbs, β, Ks) and the MAC value MAC [Kbs] (Nbs, β, Ks, IDa)) from the received data in line with the order of the data, and decrypts the encryption message ENC [Kbs] (Nbs, β, Ks) to obtain the session key Ks and the like. In this step, the node B compares the nonce Nbs extracted from the message with the nonce Nbs stored in the node B (the storage unit 21), thereby checking whether or not the message is falsified. When the received nonce Nbs is not equal to the stored nonce Nbs, the node B considers the message to be invalid, and does not perform the subsequent procedure.

Moreover, the node B calculates the MAC value MAC [Kbs] (Nbs, β, Ks, IDa) from the nonce Nbs stored in the node B, the additional information "β" and the session key Ks obtained by decrypting the message, the identification information IDa of the node A as the communication partner, and the secret key Kbs retained by the node B, by use of the same algorithm as the authentication server S. The node B compares the calculated MAC value MAC [Kbs] (Nbs, β, Ks, IDa) with the MAC value MAC [Kbs] (Nbs, β, Ks, IDa) received from the authentication server S, thereby checking whether or not the message is falsified. When the calculated MAC value is not equal to the received MAC value, the node B considers the message to be invalid, and does not perform the subsequent procedure.

The identification information IDa of the node A as the communication partner of the node B may be preliminarily stored in the node B. Besides, when the identification information IDa is included in the message as the option, the node B uses the identification information IDa extracted from the message (see FIG. 3).

When the node B detects no defects in the data received from the authentication server S, the node B (the calculation unit 25) calculates the MAC value MAC [Ks] (Nas, Nbs, IDb) by use of the session key Ks received from the authentication server S, the nonce Nas received from the node A in the procedure P1, the nonce Nbs created by the node B, and the identification information IDb of the node B.

In addition, the node B extracts the set of the encryption message ENC [Kas] (Nas, α, Ks) and the MAC value MAC [Kas] (Nas, α, Ks, IDb) from the received data. The node B sends, to the node A, the extracted set followed by the MAC value MAC [Ks] (Nas, Nbs, IDb) and the nonce Nbs created by the node B (P4). The nonce Nbs is added to the extracted set because the node A needs the nonce Nbs to make calculation.

For the same reason that the nonce Nab is used as the option with regard to the data sent to the node B from the node A, the nonce Nba may be used instead of the nonce Nbs with regard to the data sent to the node A from the node B at the procedure P4. The nonce Nba is used only for sending the data from the node B to the node A, and is newly created by the node B (the nonce creation unit 22). When the nonce Nab is used in the procedure P1, the nonce Nab can be used also instead of the nonce Nas with regard to the MAC value MAC [Ks] (Nas, Nbs, IDb) in the procedure P4. In brief, the MAC value MAC [Ks] (Nab, Nba, IDb) can be used. In this instance, not the nonce Nbs but the nonce Nba is added to the message and sent from the node B to the node A.

Upon receiving the data indicated by the procedure P4 from the node B, the node A extracts the encryption message ENC [Kas] (Nas, α, Ks) from the received data, and decrypts the extracted encryption message to obtain the session key Ks and the like. In this step, the node A extracts, with reference to the order of the messages in the data, the message to be decrypted from the received data. The node A compares the nonce Nas extracted from the message with the nonce Nas stored in the node A, thereby checking whether or not the message is falsified. When the received nonce Nas is not equal to the stored nonce Nas, the node A considers the message to be invalid, and does not perform the subsequent procedure.

Moreover, the node A calculates the MAC value MAC [Kas] (Nas, α, Ks, IDb) from the nonce Nas stored in the node A, the additional information "α" obtained by decrypting the message, the session key Ks obtained by decrypting the message, the identification information IDb of the node B as the communication partner, and the secret key Kas held by the node A, by use of the same algorithm as the authentication server S. The node A compares the calculated MAC value MAC [Kas] (Nas, α, Ks, IDb) with the MAC value MAC [Kas] (Nas, α, Ks, IDb) received from the authentication server S, thereby checking whether or not the message is falsified. When the calculated MAC value is not equal to the received MAC value, the node A considers the message to be invalid, and does not perform the subsequent procedure.

The identification information IDb of the node B as the communication partner of the node A may be preliminarily stored in the node A. Besides, when the identification information IDb is included in the communication message as the option, the node A uses the identification information IDb extracted from the message.

Further, the node A (the calculation unit 15) calculates the MAC value MAC [Ks] (Nas, Nbs, IDb) by use of the nonce Nas stored in the node A, the nonce Nbs sent from the node B, the identification information IDb of the node B as the communication partner of the node A, and the session key Ks obtained by decrypting the message. The node A (the authentication unit 16) compares the calculated MAC value with the MAC value MAC [Ks] (Nas, Nbs, IDb) received from the node B, thereby checking whether or not the message is falsified. Also in this instance, when the calculated MAC value is not equal to the received MAC value, the node A considers the message to be invalid, and does not perform the subsequent procedure.

As described in the above, upon receiving the session key Ks from the node B without any problem, the node A stores the session key Ks received from the node B. Further, the node A creates the MAC value MAC [Ks] (Nas, Nbs) used as an acknowledgment to the node B by use of the nonces Nas and Nbs and the session key Ks (by the calculation unit 15), and sends the created MAC value to the node B (P5).

When the nonces Nab and Nba as the options are used instead of the nonces Nas and Nbs, and the MAC value MAC [Ks] (Nab, Nba, IDb) is used, and the node A receives the nonce Nba in the procedure P4 (see FIG. 3), the node A uses the MAC value MAC [Ks] (Nab, Nba, IDb) for detecting a defect in the message.

Figure 1:
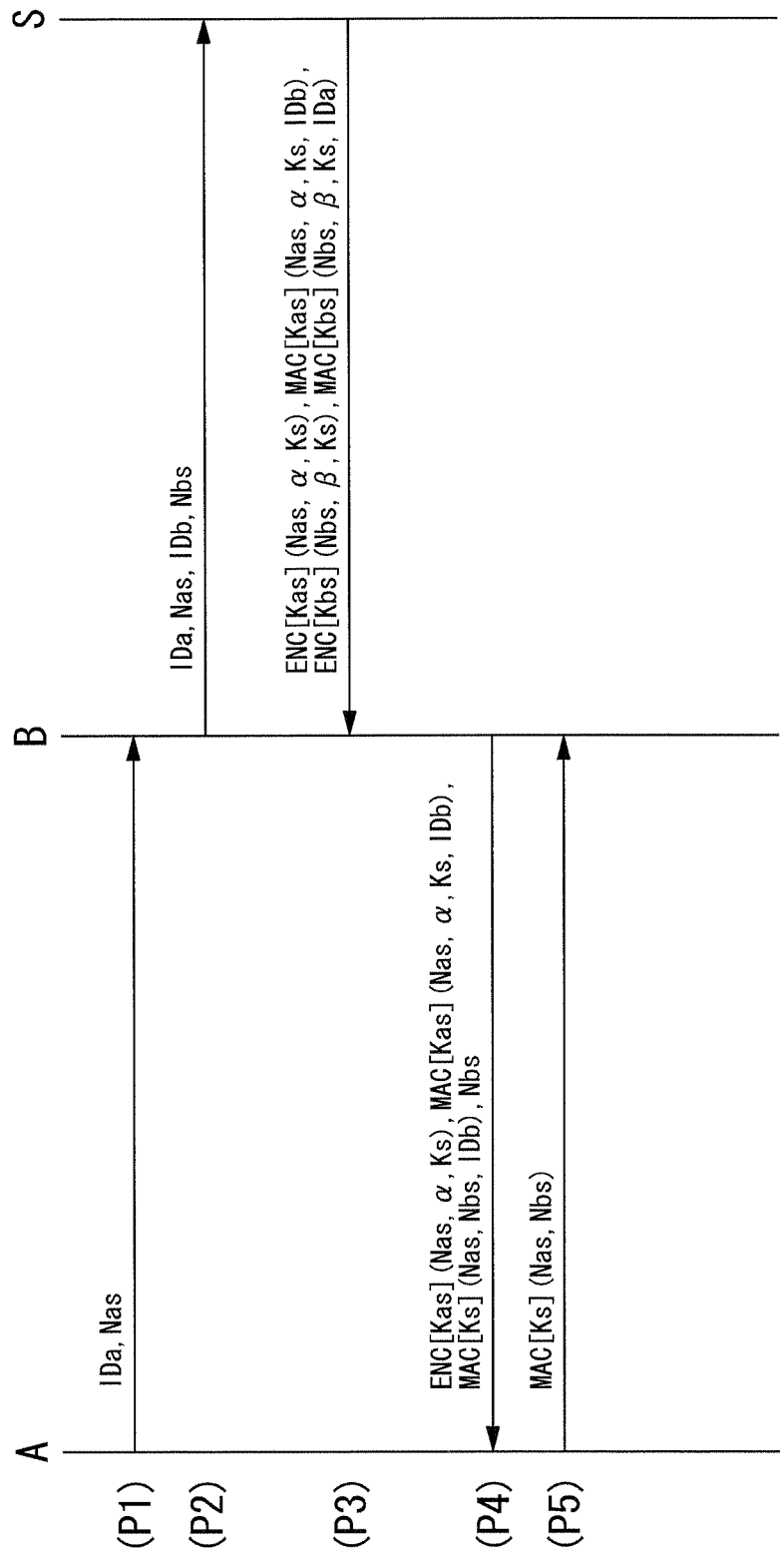
FIG. 1 is an explanatory diagram illustrating the operation of the encryption key distribution system of the first embodiment.

As shown in FIG. 1, the authentication server S completes the procedure of the key distribution when receiving the response from the node B after distributing the session key Ks to the nodes A and B. As shown in FIG. 3, each of the nodes A and B may be configured to send an acknowledgement to the authentication server S. In this instance, the authentication server S sends an acceptance receipt to the nodes A and B in response to receiving the acknowledgement. The following explanation is made to an operation where the authentication server S receives the acknowledgement.

In order to send the acknowledgement to the authentication server S in addition to the acknowledgement to the node B in the procedure P5, the node A sends the MAC value MAC [Ks] (Nab, Nba) to the node B instead of the MAC value MAC [Ks] (Nas, Nbs) together with the MAC value MAC [Kas] (Nas, Ks) used as the acknowledgement to the authentication server S (see procedure P5 in FIG. 3).

In the procedure of sending the acknowledgement to the authentication server S, the node A is preferred to newly create a nonce Nas' (by the nonce creation unit 12). Preferably, the node A temporarily stores the nonce Nas' (in the storage unit 11) until receiving the response from the authentication server S. When the node A creates the nonce Nas', the node A sends the nonce Nas' to the node B together with the acknowledgement.

Upon receiving the data from the node A in the procedure P5, the node B separates the MAC value MAC [Ks] (Nas, Nbs) for the node B from the received data in line with the order of the data. Further, the node B calculates (by the calculation unit 25) the MAC value MAC [Ks] (Nas, Nbs) by use of the stored session key Ks and the temporarily stored nonces Nbs and Nas. Thereafter, the node B compares (by the authentication unit 26) the calculated MAC value with the received MAC value. Upon judging that the received MAC value is equal to the calculated MAC value, the node B stores the session key Ks without any change.

Further, the node B newly creates a nonce Nbs' (by the nonce creation unit 22), and calculates the MAC value MAC [Kbs] (Nbs, Ks) for the authentication server S (by the calculation unit 25). The node B sends the MAC value MAC [Kbs] (Nbs, Ks) and the nonce Nbs' to the authentication server S together with the MAC value MAC [Kas] (Nas, Ks) and the nonce Nas' from the node A to the authentication server S (P6). The node B temporarily stores the nonce Nbs' (in the storage unit 21) until receiving the acceptance receipt from the authentication server S.

For the same reason as explained in the procedure P1, the nonces Nas' and Nbs' used for the acknowledgment to the authentication server S are newly created, in order to ensure that the nonce is used only one time and thus improve the security of the communication. However, sending the new nonces Nas' and Nbs' causes an increase in traffic. Therefore, in order to avoid an increase in traffic, the nonces Nas and Nbs received in the procedure P2 may be used for the acknowledgment.

Upon receiving the acknowledgment from the node B in the procedure P6, the authentication server S (the calculation unit 33) calculates the MAC values MAC [Kas] (Nas, Ks) and MAC [Kbs] (Nbs, Ks) based on the secret keys Kas and Kbs stored in the key database, the stored session key Ks, and the nonces Nas and Nbs. The authentication server S compares the calculated MAC value with the MAC value received in the procedure P6. Upon acknowledging that the calculated MAC value is not identical to the MAC value received in the procedure P6, the authentication server S (the calculation unit 33) determines the failure of the distribution of the session key Ks, and then terminates the processing without sending the acceptance receipt to the nodes A and B.

In this situation, the nodes A and B determine the failure of the reception of the valid session key Ks (by the authentication units 16 and 26, respectively). When the nodes A and B determine the failure of the reception of the valid session key Ks, the nodes A and B discard the retained session key Ks, and request the distribution of the session key Ks as necessary. When the authentication units 16 and 26 fail to receive the acceptance receipt from the authentication server S before a lapse of a predetermined limited time period, the authentication units 16 and 26 determine the failure of the reception of the valid session key Ks.

Upon acknowledging that the calculated MAC value is identical to the MAC value received in the procedure P6, the authentication server S calculates (by the calculation unit 33) the MAC value MAC [Kas] (Nas') for the node A based on the secret key Kas of the node A and the nonce Nas' which is calculated by the node A and thereafter is received by the authentication server S. In addition, the authentication server S calculates (by the calculation unit 33) the MAC value MAC [Kbs] (Nbs') for the node B based on the secret key Kbs of the node B and the nonce Nbs' which is calculated by the node B and thereafter is received by the authentication server S. The authentication server S sends the calculated MAC values MAC [Kas] (Nas') and MAC [Kbs] (Nbs') to the node B.

Upon receiving the data specified in the procedure P7 from the authentication server S, the node B separates and extracts the MAC value MAC [Kbs] (Nbs') corresponding to the node B from the received data in line with the order of the received data. Further, the node B calculates (by the calculation unit 25) the MAC value MAC [Kbs] (Nbs') based on the secret key Kbs and the nonce Nbs' temporarily stored, and compares (by the authentication unit 26) the calculated MAC value with the received MAC value.

Upon acknowledging that the calculated MAC value is identical to the received MAC value, the node B determines to use the retained session key Ks for communicating with the node A, and sends, to the node A, the MAC value MAC [Kas] (Nas') received from the authentication server S. In contrast, upon acknowledging that the MAC value calculated in the procedure P7 is not identical to the MAC value received in the procedure P7, the node B discards the retained session key Ks, and terminates the processing without sending the MAC value to the node A.

Upon receiving the MAC value MAC [Kas] (Nas') from the node B in the procedure P8, the node A calculates (by the calculation unit 15) the MAC value MAC [Kas] (Nas') based on the secret key Kas and the nonce Nas', and compares (by the authentication unit 16) the calculated MAC value with the received MAC value. Upon acknowledging that the calculated MAC value is identical to the received MAC value, the node A determines to use the retained session key Ks for communicating with the node B.

By contrast, upon acknowledging that the calculated MAC value is not identical to the received MAC value, or that the node A fails to receive the MAC value MAC [Kas] (Nas') from the node B before a lapse of a predetermined limited time period from the time of sending the data to the node B in the procedure P5, the node A discards the retained session key Ks, and then requests the distribution of the session key Ks again as necessary.

Figure 8:
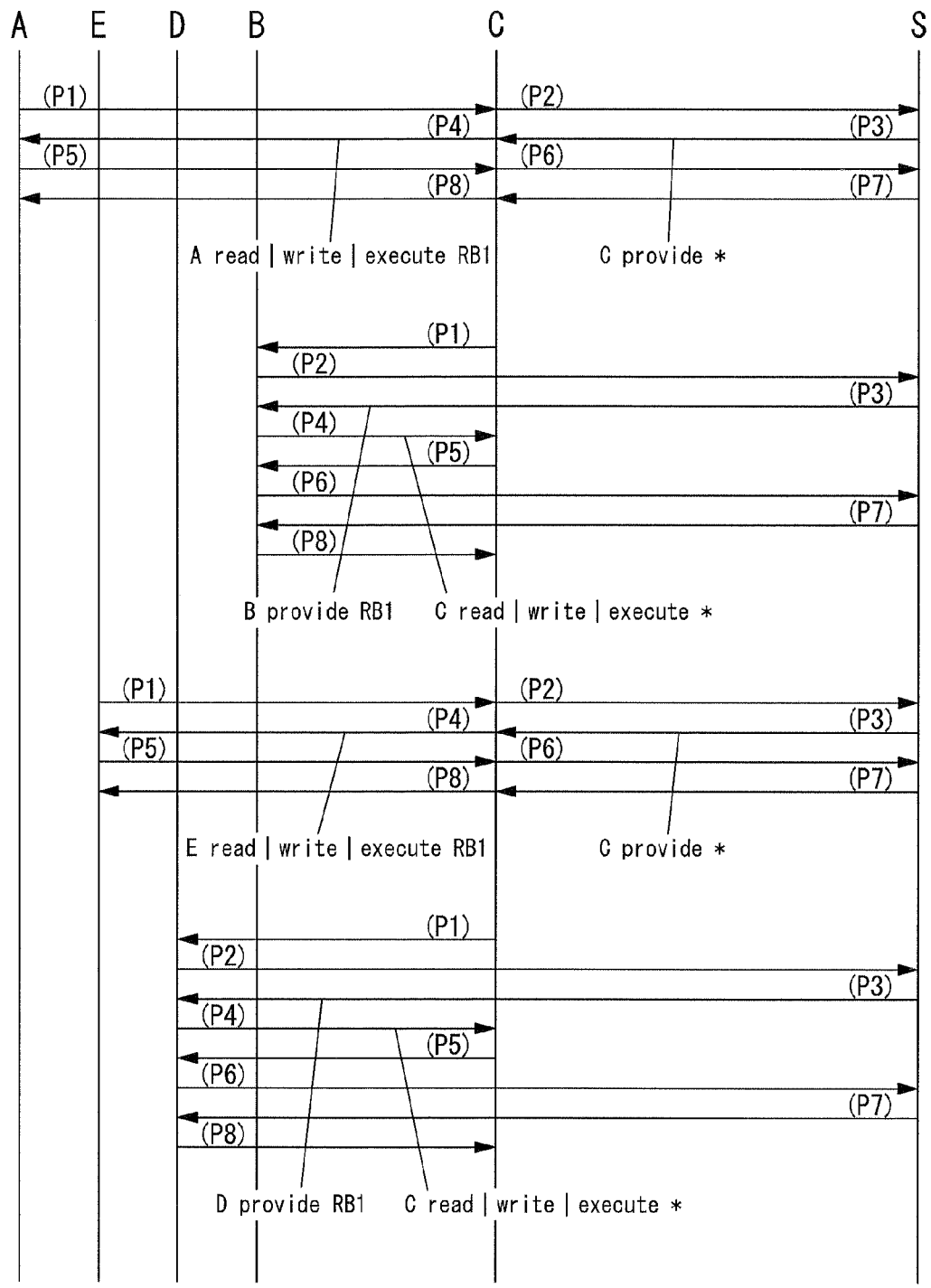
FIG. 8 is an explanatory diagram illustrating the operation of the encryption key distribution system of the fourth embodiment.

As explained in the above, with employing the procedures P1 to P5 illustrated in FIG. 1 or the procedures P1 to P8 illustrated in FIG. 8, it is possible to distribute the session key Ks in a secure manner. Besides, FIG. 1 illustrates the operation instance where no options are included. FIG. 3 illustrates the operation instance where all the options are included. However, the options are selected appropriately in consideration of the aforementioned explanation, as necessary.

Like the aforementioned procedures P3 and P4, an encryption method referred to as "AES-CCM" proposed by RFC4309 may be used for sending a set of the encrypted message and the MAC value. In brief, AES may be used for encrypting the message, and CCM-MAC may be used as the MAC value.

The encryption key distribution process employed by the encryption key distribution system of the present embodiment as mentioned in the above is a process of distributing a session key used for the communication within a group including plural nodes in a computer communication system. An authentication server has a function of creating a session key and a function of distributing the session key to respective nodes included in the group. The authentication server shares secret keys with the respective nodes. The key distribution process includes the steps of: sending, to the authentication server, identification information of one node in the group, a nonce created by the one node, and identification information of the other node in the group; creating, by the authentication server, the session key which the nodes in the group use commonly; calculating, by the authentication server, a message authentication code value by use of a secret key of each node from a message including the nonce received from the first node, the created session key, and appropriate additional information; sending, by the authentication server, to each node, encryption message for each node obtained by encrypting at least the nonce received from the first node, the created session key, and the additional information with the secret key of each node, together with the message authentication code value calculated by use of a secret key of each node; obtaining, by each node in the group, the session key by decrypting encryption data received from the authentication sever; and calculating, by each node in the group, a message authentication code value by use of a secret key and the decrypted encryption data, and determining, by each node, that the obtained session key is authenticated, upon acknowledging that the calculated message authentication code is identical to the message authentication code received from the authentication server.

In order to implement the above key distribution system, the encryption key distribution system of the present embodiment includes the first node A, the second node B, and the authentication server S. The authentication server S is configured to create the session key used for encryption communication between the first node A and the second node B.

The first node A and the authentication server S are configured to retain the first secret key used for encryption communication between the first node A and the authentication server S. The second node B and the authentication server S are configured to retain the second secret key used for encryption communication between the second node B and the authentication server S.

The first node A is configured to create the first nonce and sends the same to the authentication server S in order to request the authentication server S to issue the session key.

The second node B is configured to create the second nonce and sends the same to the authentication server S in order to request the authentication server S to issue the session key.

The authentication server S is configured to newly create the session key in response to receiving the first nonce and the second nonce.

The authentication server S is configured to calculate the first message authentication code value by use of the first secret key from the first message. The first message is designed to include the received first nonce, the newly created session key, and predetermined first additional information. The authentication server S is configured to create the first encryption message by encrypting the received first nonce, the newly created session key, and the first additional information with the first secret key. The authentication server S is configured to send the first encryption message and the first message authentication code value to the first node.

The authentication server S is configured to calculate the second message authentication code value by use of the second secret key from the second message. The second message is designed to include the received second nonce, the newly created session key, and predetermined second additional information. The authentication server S is configured to create the second encryption message by encrypting the received second nonce, the newly created session key, and the second additional information with the second secret key. The authentication server S is configured to send the second encryption message and the second message authentication code value to the second node.

The first node A is configured to, in response to receiving the first encryption message and the first message authentication code value, obtain the session key and the first additional information by decrypting the first encryption message with the first secret key. The first node A is configured to calculate the first message authentication code value by use of the first nonce stored by the first node, the session key and the first additional information obtained by decrypting the first encryption message, and the first secret key. The first node A is configured to authenticate the session key received from the authentication server S by judging whether or not the first message authentication code value calculated by the first node A is equal to the first message authentication code value received from the authentication server S.

The second node B is configured to, in response to receiving the second encryption message and the second message authentication code value, obtain the session key and the second additional information by decrypting the second encryption message with the second secret key. The second node B is configured to calculate the second message authentication code value by use of the second nonce stored by the second node, the session key and the second additional information obtained by decrypting the second encryption message, and the second secret key. The second node B is configured to authenticate the session key received from the authentication server S by judging whether or not the second message authentication code value calculated by the second node B is equal to the second message authentication code value received from the authentication server S.

According to the present embodiment, the authentication server S creates the encryption message for each node by encrypting at least the nonce received from the first node, the created session key, and the additional information with the secret key of each node, and calculates the message authentication code value from the nonce received from the first node, the created session key, and the additional information. The authentication server S attaches the message authentication code value to the encryption message, and sends the message authentication code value and the encryption message to each node. Therefore, in the process where the authentication server distributes the session key to the respective nodes, the authenticity can be checked based on the message authentication code value. Further, it is possible to send the additional information other than the session key in an encryption manner. In brief, the additional information is encrypted when the authentication server sends the additional information to the respective nodes. Therefore, other nodes cannot sniff the additional information. In addition, the encryption message sent to the node includes information necessary to calculate the message authentication code value. Therefore, the node receiving the session key can calculate the message authentication code value derived from the message including the additional information. Consequently, it is possible to check whether or not the session key and the additional information are not altered (that is, the authenticity).

Second Embodiment

Figure 5:
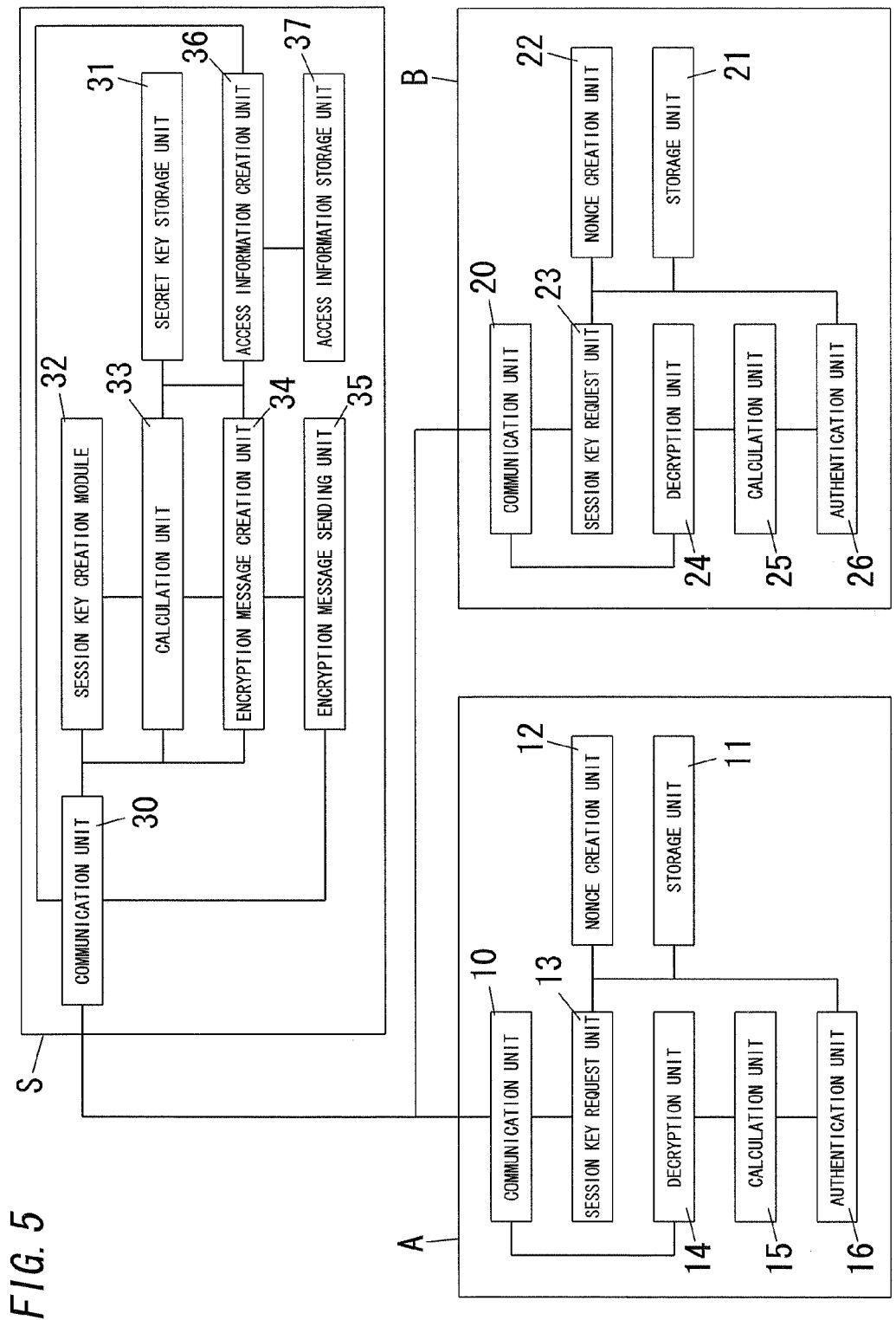
FIG. 5 is a diagram illustrating configuration of the above encryption key distribution system.

As shown in FIG. 5, the encryption key distribution system of the present embodiment is mainly different from the encryption key distribution system of the first embodiment in that the authentication server S includes an access information creation unit 36 and an access information storage unit 37.

In the encryption key distribution system of the present embodiment, request information (access request information) regarding access control, registration information (access registration information) regarding the access control, and authorization information (access authorization information) regarding the access control are used as information regarding the access control (information indicative of whether or not access between nodes is permitted). The access request information is defined as information indicative of access authority which a node requests. The access registration information is defined as information indicative of access authority which is preliminarily given to a node by a maker or a manager of nodes. The access authorization information is defined as information indicative of access authority which is given to a node actually. In the present embodiment, the access authorization information is created based on the access request information and the access registration information.

The access information storage unit 37 is configured to store the registration information regarding the access control.

The access information creation unit 36 is configured to create the authorization information regarding the access control. For example, the access information creation unit 36 is configured to, upon receiving the request information Pas (Pbs) of the access control from the node A (B), determine an intersection (in other words, a product set) of the received request information Pas (Pbs) of the access control and the registration information regarding the access control. The access information creation unit 36 is configured to use the determined intersection as the authorization information Psa (Psb) regarding the access control.

In the present embodiment, the encryption message creation unit 34 is configured to use, as the first additional information "α", the authorization information regarding the access control with regard to the node A created by the access information creation unit 36. The encryption message creation unit 34 is configured to use, as the second additional information "β", the authorization information regarding the access control with regard to the node B created by the access information creation unit 36.

In the present embodiment, the session key request unit 13 is configured to send the nonces Nas and Nab created by the nonce creation unit 12, the identification information IDa and IDb stored in the storage unit 11, and the access request information Pas to the authentication server S via the node B. In brief, the session key request unit 13 is configured to send the nonces Nas and Nab, the identification information IDa and IDb, and the access request information Pas to the node B. Further, the session key request unit 23 is configured to, upon receiving the nonces Nas and Nab, the identification information IDa and IDb, and the access request information Pas from the node A, send the second nonce Nbs created by the nonce creation unit 22 and the access request information Pbs to the authentication server S together with the nonces Nas and Nab, the identification information IDa and IDb, and the access request information Pas which are received from the node A.

The operation instance of the present embodiment indicates an operation where the access control is performed in addition to the operation mentioned in the first embodiment. For example, in the first embodiment, the additional information ("α", "β") is the available period of the session key, the number of times of access, or the charging information. By contrast, in the present embodiment, the additional information ("α", "β") is used for access control. The access control includes control of determining whether or not each one of the nodes (A, B) provides the retained information to the other node (A, B) (i.e., providing the information retained by each one of the nodes (A, B) to the other node (A, B)), and operations (reading, writing, or executing) which are processed by each one of the nodes (A, B) to modify the information provided by the other node (A, B). In brief, the information of the access control is used to select available information from the information retained by the node (A, B) and to determine the operation performed with regard to the selected available information.

The following explanation is made to the operation instance illustrated in FIG. 3 including the options mentioned in the first embodiment modified so as to enable the access control. Besides, the operation instance illustrated in FIG. 1 can be modified so as to enable the access control. When the following instance is applied to the 2PDKP, the following instance can be modified so as not to include the authentication server S in line with FIG. 10.

Figure 4:
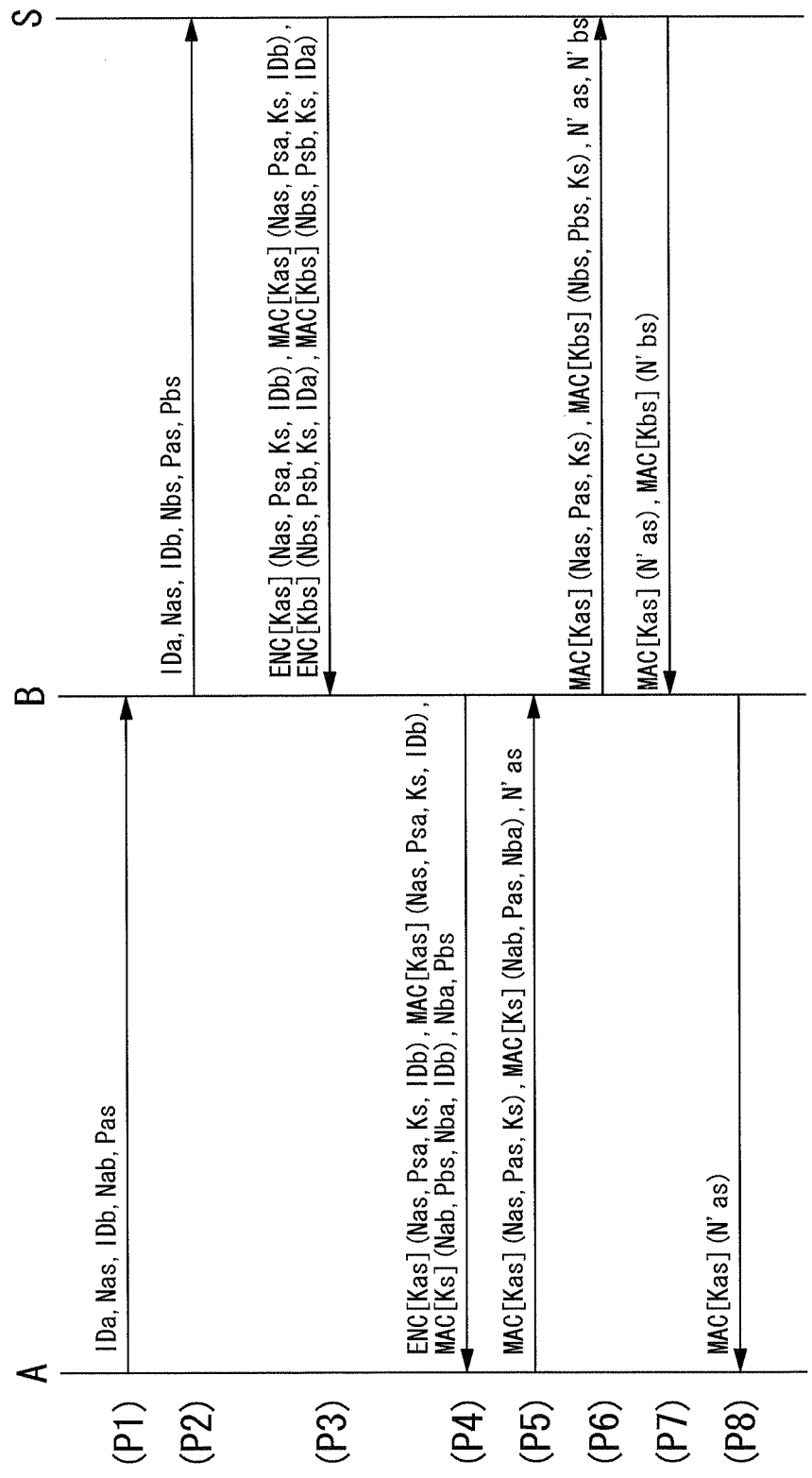
FIG. 4 is an explanatory diagram illustrating the operation of the encryption key distribution system of the second embodiment.

According to the present operation instance, for enabling the access control, as shown in FIG. 4, the request information (access request information) Pas of the access control is included in the date sent from the node A to the node B in the procedure P1, and the request information Pas and Pbs of the access control are included in the date sent from the node B to the authentication server S in the procedure P2. In the present operation instance, the request information Pas and Pbs of the access control are the options used as necessary. The present operation instance relates to an operation of the access control. Therefore, the following explanation is made to only operation using the request information Pas and Pbs of the access control.

Upon receiving the request information Pas and Pbs of the access control from the node B, the authentication server S creates (by the access information creation unit 36) the authorization information Psa regarding the access control for the node A and the authorization information Psb regarding the access control for the node B. The authentication server S adopts the authorization information Psa of the access control as the additional information "α" used in the procedures P3 and P4, and the authorization information Psb of the access control as the additional information "β" used in the procedures P3 and P4.

In the present operation instance, the request information Pbs of the access control from the node B to the authentication server S is used in the procedure P4, and the request information Pas and Pbs of the access control is used for calculating the MAC values in the procedures P5 and P6.

The authentication server S has a function of controlling the access from one of the nodes A and B to the other on the basis of the information retained by the nodes A and B in addition to the function of enabling the communication between the nodes A and B by issuing the session key Ks to the nodes A and B. The authorization information (Psa, Psb) regarding the access control created by the authentication server S is classified into the following plural classes. Upon receiving the request information (Pas, Pbs), the authentication server S creates (by the access information creation unit 36) the authorization information (Pas, Pbs) respectively corresponding to a class selected from the following classes in line with a predetermined rule.

According to the request information (Pas, and Pbs) of the access control and the authorization information (Psa, and Psb) of the access control, an operation with regard to the information stored by the node (A, B) can be selected from four operations of a reading operation, a writing operation, an executing operation, and a providing operation. In the following explanation, the reading operation, the writing operation, the executing operation, and the providing operation are represented as "read", "write", "execute", and "provide", respectively. For example, when the information retained by the node B is designated as RB, the information indicating that the node A requests reading out the information RB is expressed as "A read RB". In another example, the information indicating that the node B provides the information RB is expressed as "B provide RB". When the plural operations are expressed side by side, the operations are distinguished from each other by use of a vertical line (|). For example, the information indicating that the node A requests reading out the information RB and writing in the information RB is expressed as "A read|write RB".

In the following explanation, the node B retains information of various classes. The following explanation is made to an instance where the authentication server S creates (by the access information creation unit 36) the authorization information Psa and Psb of the access control in order to limit the class of the information which the node A can access with regard to the information of various classes retained by the node B. In brief, the authentication server S issues the authorization information Psa regarding the node A and the authorization information Psb regarding the node B, on the basis of the access request from the node A to the node B and the information which the node B permits providing.

In the following explanation, the node B retains the information RB1, RB2, and RB3 of three classes. The node A requests accessing all the information RB1, RB2, and RB3 of the node B, and requests all the operations of the reading operation, the writing operation, and the executing operation. The node B permits only providing the information RB1.

In brief, the request information Pas of the access control from the node A is expressed as "A read|write|execute RB1, RB2, RB3". The node A sends the request information Pas to the authentication server S by way of the node B (P1). The node B sends "B provide RB1" to the authentication server S as the request information Pbs (P2).

The authentication server S stores the registration information (registration information of the access control) with regard to the access control for each of the nodes A and B. A manufacturer of the nodes A and B or the manager preliminarily stores, for each of the nodes A and B, the registration information of the access control in the access information storage portion (access information storage unit) 37 provided to the authentication server S. The registration information of the access control for the node A indicates "A read|write|execute RB1, RB2", and the registration information of the access control for the node B indicates "B provide RB1, RB2".

Upon receiving the request information Pas and Pbs of the access control from the node B, the authentication server S determines (by the access information creation unit 36) the intersection (product set) of the request information Pas of the access control and the registration information of the access control regarding the node A and the intersection (product set) of the request information Pbs of the access control and the registration information of the access control regarding the node B.

In the aforementioned instance, the request information Pas of the access control from the node A indicates "A read|write|execute RB1, RB2, RB3", and the registration information of the access control regarding the node A indicates "A read|write|execute RB1, RB2". Therefore, the intersection regarding the node A indicates "A read|write|execute RB1, RB2". The request information Pbs of the access control from the node B indicates "B provide RB1", and the registration information of the access control regarding the node B indicates "B provide RB1, RB2". Therefore, the intersection regarding the node B indicates "B provide RB1".

The authentication server S (the access information creation unit 36) treats the intersection determined for the node A as the authorization information Psa of the access control, and also treats the intersection determined for the node B as the authorization information Psb of the access control. That is, the authorization information Psa of the access control for the node A indicates "A read|write|execute RB1, RB2", and the authorization information Psb of the access control for the node B indicates "B provide RB1".

As explained in the above, in the procedures P4 to P6 as well as the procedures P3 and P4, the authorization information Psa and Psb of the access control are adopted (by the encryption message creation unit 34) as the additional information "α" and "β", respectively. In brief, the authentication server S sends the authorization information Psa and Psb of the access control to the nodes A and B, respectively.

When receiving the authorization information Psa and Psb of the access control, the respective nodes A and B are permitted to perform only the operation which is included in the request information from the communication initiator of the node A and also included in the request information for the access control given from the communication responder of node B.

The authorization information Psa of the access control sent from the authentication server S to the node A indicates "A read|write|execute RB1, RB2". Therefore, the node A requests the reading operation, the writing operation, and the executing operation with regard to the information RB1 and RB2 of the node B. The authorization information Psb of the access control sent to the node B indicates "B provide RB1". Therefore, the service available for the node A from the node B is limited to the information RB1 provided by the node B. In brief, the node A is permitted to perform the reading operation, the writing operation, and the executing operation with regard to only the information RB1 retained by the node B.

In the above operation instance, the authorization information Psa regarding the access control is created by use of the intersection (product set) of the registration information of the access control preliminarily stored in the authentication server S and the request information Pas of the access control which the authentication server S receives from the node A. Further, the authorization information Psb of the access control is created by use of the intersection (product set) of the registration information of the access control preliminarily stored in the authentication server S and the request information Pbs of the access control which the authentication server S receives from the node B. However, the authorization information Psa and Psb regarding the access control may be defined by a collection (union) instead of the intersection.

Using the product set provides the restricted access control based on the request information from the nodes A and B. Therefore, a strict policy can be provided. By contrast, using the union provides the expanded access control based on the request information from the nodes A and B.

The registration information of the access control stored in the authentication server S is updated at a proper timing. Therefore, an event where the nodes A and B fail to notice that the registration information of the access control has been updated is likely to occur. In view of this event, upon acknowledging that the registration information of the access control includes no request information of the access control received from the nodes A and B, the authentication server S treats the registration information of the access control as the authorization information of the access control, and sends the addition information "α" and "β" for the nodes A and B including the authorization information to the nodes A and B, respectively. Therefore, the nodes A and B can receive, as the authorization information of the access control, the registration information of the access control newly stored in the authentication server S.

In the above situation, the authorization information of the access control is included in the encryption messages for the nodes A and B, and is used for calculating the message authentication code value. Therefore, the nodes A and B can receive the authorization information of the access control with keeping the authorization information secret from an unauthorized person. In addition, it is possible to check the authenticity by use of the message authentication code. Consequently, it is enabled to deliver the authorization information of the access control to the nodes A and B in a secure manner. Further, according to the above arrangement, the authorization information of the access control given to the nodes A and B can be modified in response to the modification of the registration information of the access control stored in the authentication server S. The modification of the access control can be made easily.

In the aforementioned instance, the request information Pas of the access control from the node A indicates "A read|write|execute RB1, RB2, RB3", and the registration information of the access control regarding the node A indicates "A read|write|execute RB1, RB2". Therefore, the authorization information Psa of the access control regarding the node A indicates "A read|write|execute RB1, RB2, RB3". Further, the request information Pbs of the access control from the node B indicates "B provide RB1", and the registration information of the access control regarding the node B indicates "B provide RB1, RB2". Therefore, the authorization information Psb of the access control regarding the node B indicates "B provide RB1, RB2".

In this situation, the node A is enabled to perform the reading operation, the writing operation, and the executing operation with regard to the information RB1 and RB2 retained by the node B.

For example, the arrangement where the authentication server S treats the union of the request information Pas of the access control and the registration information of the access control as the authorization information Psa of the access control provided to the node A and treats the union of the request information Pbs of the access control and the registration information of the access control as the authorization information Psb of the access control provided to the node B is considered to be effective for the instance where the node A is permitted to operate all information.

In this instance, when the registration information of the access control for the node A is made by use of a wildcard (*) designating all the information (in other words, the registration information of the access control created so as to indicate "A read|write|execute *"), the authentication server S creates the authorization information Psa of the access control regarding the node A which indicates "A read|write|execute*" irrespective of contents of the request information Pas of the access control from the node A. Therefore, the node A can operate all information provided from the other node.

With regard to the instance where the authorization information Psa of the access control is defined as the product set of the request information Pas of the access control and the registration information of the access control, both the request information Pas of the access control and the registration information of the access control need include the wildcard (*) for designating information. By contrast, with using the union, only the registration information of the access control retained by the authentication server S is required to include the wildcard (*) because the wildcard (*) used in the registration information is reflected in the authorization information Psa of the access control regarding the node A.

Even when the union is used, the information available for the node A is limited to the information provided from the other node.

In the aforementioned operation instance, the authentication server S treats, as the authorization information Psa and Psb of the access control, the product sets or the unions of the request information Pas and Pbs of the access control from the nodes A and B and the registration information of the access control retained by the authentication server S. However, a difference set may be used as the authorization information of the access control. Alternatively, a combination of various kinds of sets may be used as the authorization information of the access control. Further, different set can be used for each of the nodes A and B. An arbitrary set can be selected for each of the authorization information Psa of the access control regarding the node A and the authorization information Psb of the access control regarding the node B.

In the above operation instance, the data sent from the node A to the authentication server S includes the request information Pas of the access control, and the data sent from the node B to the authentication server S includes the request information Pbs of the access control in the procedures P1 and P2. However, in an instance where, in the procedures P1 and P2, the data sent from the node A includes no request information Pas of the access control and the data sent from the node B includes no request information Pbs of the access control, the server S sends, to the node A, the registration information of the access control regarding the node A as the authorization information Psa of the access control and sends, to the node B, the registration information of the access control regarding the node B as the authorization information Psb of the access control.

Besides, according to the present operation instance, the nodes A and B receive the authorization information Psa and Psb of the access control together with the session key Ks, respectively. The nodes A and B can operate the information designated by the authorization information Psa and Psb of the access control via the communication using the session key Ks. If the additional information "α" and "β" explained in the first embodiment would be necessary, the additional information "α" and "β" may be attached to the front side or the rear side of the authorization information Psa and Psb, respectively. The other configurations and operations of the present embodiment are the same as those of the first embodiment.

According to the present operation instance, in the procedures P1 and P2, the request information Pas and Pbs of the access control are sent, as the additional information, to the authentication server S from the nodes A and B. However, the authorization information Psa and Psb of the access control are encrypted. Therefore, the authorization information Psa and Psb of the access control are kept secret. Besides, if the request information Pas and Pbs of the access control are unnecessary, the request information Pas and Pbs may not be sent.

The encryption key distribution process employed by the encryption key distribution system of the present embodiment as mentioned in the above is a process of distributing a session key used for the communication within a group including plural nodes in a computer communication system. An authentication server which has a function of creating a session key and a function of distributing the session key to respective nodes included in the group shares secret keys with the respective nodes. The key distribution process includes the steps of; sending, to the authentication server, identification information of one node in the group, a nonce created by the one node, and identification information of the other node in the group; creating, by the authentication server, the session key which the nodes in the group use commonly; calculating, by the authentication server, a message authentication code value by use of a secret key of each node from a message including the nonce received from the first node, the created session key, and additional information including authorization information of access control; sending, by the authentication server, to each node, encryption message for each node obtained by encrypting at least the nonce received from the first node, the created session key, and the authorization information of the access control with the secret key of each node, together with the message authentication code value calculated by use of a secret key of each node; obtaining, by each node in the group, the session key and the authorization information of the access control by decrypting encryption data received from the authentication sever; and calculating, by each node in the group, a message authentication code value by use of a secret key and the decrypted encryption data, and determining, by each node, that the obtained session key is authenticated, upon acknowledging that the calculated message authentication code is identical to the message authentication code received from the authentication server.

In order to realize the above key distribution process, in the encryption key distribution system of the present embodiment, each of the first additional information "α" and the second additional information "β" are defined as the authorization information of the access control.

The configuration of the present embodiment is similar to that of the first embodiment, except the additional information includes the authorization information of the access control. Therefore, the present embodiment provides the same effect as the first embodiment. In the prior art explained as the background art, the authorization information of the access control is sent to the node without being encrypted. In contrast to the prior art, the present embodiment includes the authorization information of the access control in the encryption message, and sends it together with the message authentication code value. Consequently, it is possible to prevent the leakage of the authorization information of the access control to a third person. Further, it is enabled to check the authenticity regarding the authorization information of the access control.

Besides, when the authentication server receives the request information of the access control from the node, the authentication server may compare the request information of the access control with the registration information of the access control preliminarily registered with regard to the node. Upon acknowledging that the registration information of the access control does not include the same information as the request information of the access control, the authentication server may treat the registration information of the access control as the authorization information of the access control regarding the node, and sends the encryption message including the authorization information together with the message authentication code value to the node in the group.

In brief, the authentication server S (the access information creation unit 36) is configured to, upon receiving the request information of the access control from the first node A or the second node B, compare the received request information of the access control with the registration information of the access control preliminarily stored in the authentication server S, and treat the registration information of the access control as the authorization information of the access control when the registration information of the access control does not include the same information as the received request information of access control.

In the above instance, when the authentication server stores the registration information regarding the access control and when the request information of the access control from the node does not include the same information as the registration information of the access control, the registration information of the access control is treated as the authorization information. Further, the authorization information is included in the encryption message and the encryption message is sent together with the message authentication code value attached thereto. According to this instance, the authorization information of the access control stored in the node can be updated in response to update of the registration information of the access control in the authentication server. In brief, the authorization information of the access control can be modified in response to the modification of the registration information of the access control stored in the authentication server. Therefore, the modification of the authorization information of the access control can be made easily.

The authentication server S (the access information creation unit 36) may be configured to create the authorization information of the access control on the basis of the variable registration information of the access control.

The authentication server S (the access information creation unit 36) may be configured to, upon receiving the request information of the access control from the node, perform a logical operation of the received request information of the access control and the registration information of the access control preliminarily stored, thereby creating the authorization information of the access control.

As described in the above, according to the instance where the authentication server stores the registration information of the access control, the access control can be modified by only modifying the registration information of the access control in the authentication server without directly changing the information of the access control stored in the node. Therefore, the modification of the access control can be made easily.

According to the instance where the authentication server stores the registration information of the access control and where the authorization information of the access control is created by calculating the logical operation of the request information of the access control from the node and the registration information of the access control, the access control can be modified by modifying at least one of the registration information of the access control in the authentication server and the process of the logical operation in the authentication server without changing the information of the access control stored in the node. Therefore, the modification of the access control can be made easily.

Third Embodiment

Figure 7:
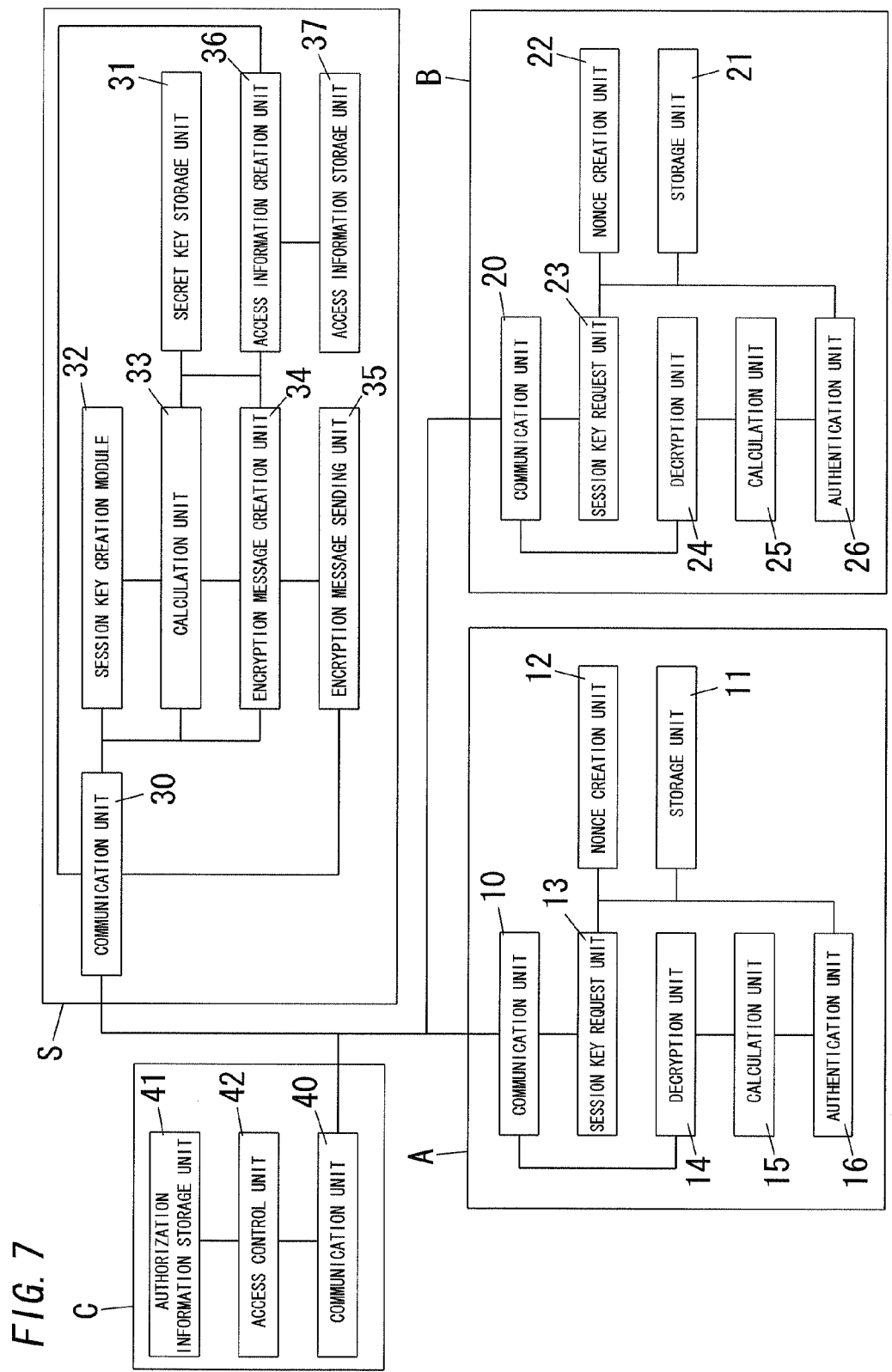
FIG. 7 is a diagram illustrating configuration of the above encryption key distribution system.

As shown in FIG. 7, the encryption key distribution system of the present embodiment is mainly different from the encryption key distribution system of the second embodiment in that the system includes a proxy node C configured to relay the communication between the first node A and the second node B.

In the present embodiment, each node is configured to indirectly communicate with the other node via the proxy node C.

In the present embodiment, the authentication server S is configured to send the authorization information of the access control to the proxy node C.

The proxy node C includes a communication unit (fourth communication unit) 40, an authorization information storage unit 41, and an access control unit 42.

The communication unit 40 is configured to communicate with each of the nodes A and B and the authentication server S via the information network.

The authorization information 41 is configured to store the authorization information of the access control received from the authentication server S.

The access control unit 42 is configured to perform the access control between the nodes A and B with reference to the authorization information regarding the access control stored in the authorization information storage unit 41.

Figure 6:
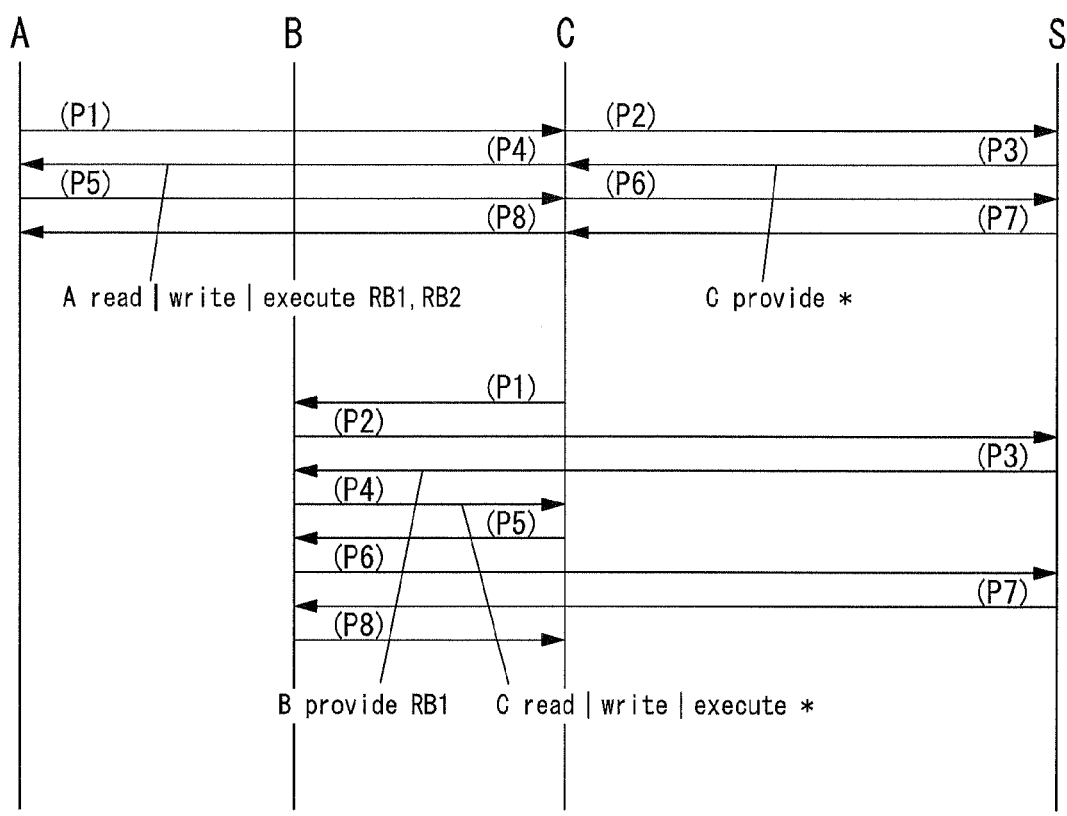
FIG. 6 is an explanatory diagram illustrating the operation of the encryption key distribution system of the third embodiment.

The present operation instance indicates an operation instance of the system which performs the access control between the nodes A and B in a similar manner as the second embodiment and includes the proxy server C. As shown in FIG. 6, the proxy node C has a function of relaying the communication between the node A as the initiator of the communication and the node B as the responder of the communication.

In brief, the nodes A and B do not communicate with each other directly, but communicate with each other via the proxy node C. In the illustrated instance, the node A as the initiator does not communicate with the authentication server S directly, too. The proxy server C instead of the node A communicates with the authentication server S. By contrast, the node B as the responder communicates with the authentication server S and the proxy server C directly.

A more detailed explanation referring to FIG. 6 is made to the system of the present embodiment. In this explanation, the node A as the initiator of the communication sends the request information of the access control to the proxy node C, and then the proxy node C accesses the authentication server S (an arrow illustrated in FIG. 6 indicates a flow of data).

In the following operation instance, the request information of the access control from the node A indicates "A read|write|execute RB1, RB2, RB3". The request information of the access control from the node B indicates "B provide RB1". The request information of the access control from the proxy node C indicates "C read|write|execute *"

The authentication server S retains the registration information regarding the access control regarding the node A indicative of "A read|write|execute RB1, RB2", the registration information of the access control regarding the node B indicative of "B provide RB1, RB2", and the registration information of the access control regarding the proxy node C indicative of "C read|write|execute *". Further, the authentication server S (the access information creation unit 36) calculates the intersections (product set) of the request information of the access control regarding the node A, the node B, and the proxy node C and the corresponding registration information of the access control, thereby creating the authentication information of the access control regarding the node A, the node B, and the proxy node C, respectively.

Upper and lower eight arrows in FIG. 6 are corresponding to the procedures P1 to P8 in FIG. 4, respectively. In brief, the upper eight arrows indicate that the node A, the proxy node C, and the authentication server S are respectively corresponding to the node A, the node B, and the authentication server S shown in FIG. 4. In addition, the lower eight arrows indicate that the proxy node C, the node B, and the authentication server S are respectively corresponding to the node A, the node B, and the authentication server S shown in FIG. 4.

In the operation shown in FIG. 6, the information "C provide *" is sent from the authentication server S to the proxy node C in the procedure P3. The information "A read|write|execute RB1, RB2" is sent from the proxy node C to the node A in the procedure P4. The information "B provide RB1" is sent from the authentication server S to the node B in the procedure P3. The information "C read|write|execute *" is sent from the node B to the proxy node C in the procedure P4.

Therefore, as shown in FIG. 6, the authorization information of the access control for the node A indicates "A read|write|execute RB1, RB2". The authorization information of the access control for the node B indicates "B provide RB1". The authorization information of the access control for the proxy node C indicates "C read write|execute|provide *" (in FIG. 6, the reading, writing, executing operations are expressed as being separated from the providing operation). Alternatively, the information "C read|write|execute *" may be sent from the authentication server S to the proxy node C in the procedure P3. Alternatively, the information "C provide *" may be sent from the node B to the proxy node C in the procedure P4. In brief, it is sufficient that the authorization information of the access control regarding the proxy node C indicative of "C read|write|execute|provide *" is created as a result.

In a situation where the authorization information of the access control is given to each of the node A, the node B, and the proxy node C as mentioned in the above, the proxy node C (the access control unit 42) relays the access from the node A to the node B (with reference to the authorization information of the access control stored in the authorization information storage unit 41). In other words, upon being accessed by the node A, the proxy node C accesses the node B and then the response from the node B is sent to the node A via the proxy node C.

The proxy node C is free from the access limitation. The access from the node A to the node B is limited based on the authorization information "A read|write|execute RB1, RB2". As a consequence, although the proxy node C relays the access from the node A to the node B, the node A is permitted to access only the information RB1 of the node B.

As described in the above, the proxy node C receives the authorization information of the access control indicative of "C read|write|execute|provide *". Therefore, when the node A requests the operation (the reading operation, the writing operation, or the executing operation) with regard to the information RB1, the proxy node C receives the request of the operation with regard to the information RB1, and the proxy node C instead of the node A requests the operation with regard to the information RB1 of the node B. Thereby, the node B provides the information RB1 on the basis of the authorization information of the access control. Therefore, the proxy node C can receive the information RB1, and provides the received information RB1 to the node A.

Also when the node A sends a request of the operation with regard to the information RB2, the proxy node C sends the request to the node B. However, the authorization information of the access control for the node B does not include the provision of the information RB2. Therefore, the node B does not provide the information RB2 to the proxy node C. As a result, the node A fails to perform the operation with regard to the information RB2.

When the request information of the access control sent from the node B indicates "B provide RB1, RB2", the node A is permitted to perform the operation with regard to the information RB2. Likewise, when the authentication server S uses, as the authorization information of the access control, the union instead of the intersection (product set) of the request information of the access control and the registration information of the access control, the node B can provide the information RB2. The other configurations and operations of the present embodiment are same as those of the second embodiment, except the present embodiment includes the proxy node C.

As mentioned in the above, the encryption key distribution system employs the configuration which includes the proxy node C configured to relay the communication between the nodes in the group and sends the authorization information of the access control from the authentication server to the proxy node.

In brief, the encryption key distribution system further includes the proxy node C configured to relay the communication between the first node A and the second node B. The authentication server S is configured to send the authorization information of the access control to the proxy node C. The proxy node C is configured to relay the communication between the first node A and the second node B with reference to the authorization information received from the authentication server S.

As described in the above, with using the proxy node for the access control, it is possible to modify the access control by revising the information of the access control at the proxy node without changing the information of the access control at the node. Therefore, the modification of the access control can be made easily.

Fourth Embodiment

The present operation instance indicates an instance where the system classifies the plural nodes into groups and performs the access control for each group. In order to simplify an explanation, as shown in FIG. 4, the four nodes A, B, D, E and the proxy node C can communicate with each other, and the system employs the authentication server S having the function of the key distribution like the aforementioned third embodiment. The operation illustrated in FIG. 8 includes a process designated by a set of eight arrows respectively corresponding to the procedures P1 to P8 shown in FIG. 4. In the following explanation, the nodes A and B is classified into a group different from a group into which the nodes D and E are classified. In the explanation, it is assumed that the node E requests information in a similar manner as the node A and that the node "F" provides information in a similar manner as the node B.

When an identifier is allocated for each class of information and plural nodes provide information of the same class, it is necessary to classify the nodes A, B, D, and E into plural group. For example, it is assumed that the identifier of RB1 is allocated to temperature information and that the nodes B and D are configured to provide the temperature information. In this example, when the two nodes A and E request the operation with regard to the information RB1, the proxy node C fails to distinguish between the request of the operation with regard to the information RB1 of the node B and the request of the operation with regard to the information RB1 of the node D.

Figure 9:
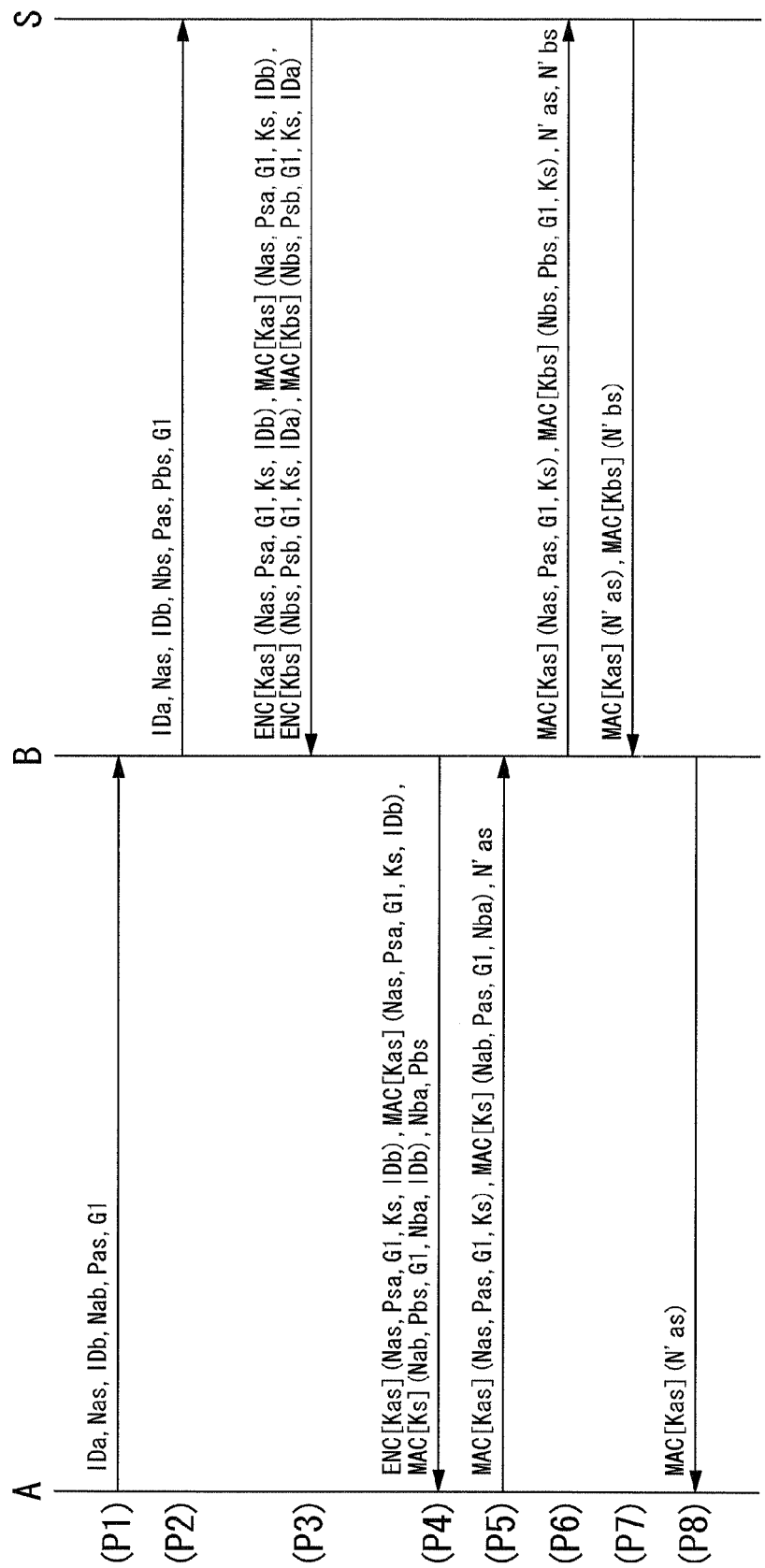
FIG. 9 is an explanatory diagram illustrating the operation of the primary part of the above encryption key distribution system.

In view of the above, with classifying a set of the nodes A and B and a set of the nodes D and E into the different group, it is possible to provide the information RB1 from the node B to the node A in response to the request from the node A, and it is possible to provide the information RB1 from the node D to the node E in response to the request from the node E. In the present operation instance, as shown in FIG. 9, a group identifier used for identifying a group is included in the additional information "α" and "β" which are sent in the procedures P3 and P4 explained in the first embodiment. In the following explanation, the set of the nodes A and B and the set of the nodes D and E are classified into the different groups. The group identifier (G1, G2) is allocated to each group.

In the present instance, the group identifier G1 is sent as the additional information in the procedures P3 and P4. The proxy node C stores the group identifier (G1, G2) in association with each of sets of the nodes to which the authentication server S distributes the same session key Ks. When the group identifier (G1, G2) of the data received by the proxy node C is not identical to the stored group identifier (G1, G2), or the data received by the proxy node C does not include the group identifier (G1, G2), the proxy node C does not relay the received data.

In brief, in the present embodiment, the authorization information storage unit 41 is configured to store the group identifier (G1, G2) for each of the sets of the nodes to which the authentication server S distributes the same session key Ks. In addition, the access control unit 42 is configured not to, when the group identifier (G1, G2) included in the data received by the communication unit 40 is not identical to the group identifier (G1, G2) stored in the authorization information storage unit 41, or when the data received by the communication unit 40 includes no group identifier (G1, G2), relay the received data.

When the single node is classified into plural groups, it is possible to select, by use of the group identifier in the procedures P1 and P2, the current group from the plural groups. When the single node belongs to the plural groups, the authentication server S is configured to calculate the union regarding the group identifier, and thereby creating the authorization information of the access control. According to this instance, the proxy node C can permit the access with regard to all the groups included in the calculated union.

For example, the nodes A and B belong to the group "1" (designated by the group identifier G1), and the nodes D and E belong to the group "2" (designated by the group identifier G2). The proxy node C selects the group identifier G1 with regard to the procedure P1 in which the proxy node C communicates with the node A. The proxy node C selects the group identifier G2 with regard to the procedure P2 in which the proxy node C communicates with the node D. The proxy node C selects the group identifier G1 with regard to the procedure P3 in which the proxy node C communicates with the node B. The proxy node C selects the group identifier G2 with regard to the procedure P4 in which the proxy node C communicates with the node E.

The proxy node C (the access control unit 42) stores a data table indicative of a correspondence relation between the group identifier and the procedure (e.g., the data table is stored in the authorization information storage unit 41). The proxy node C (the access control unit 42) refers to the data table and then determines whether or not it relays the data between the nodes. Likewise, when the group identifier is associated with specific information, the node which has received information can select the specific information by use of the group identifier.

An explanation referring to FIG. 8 is made to the operation instance of the present embodiment. FIG. 8 illustrates an instance where the node A obtains the information RB1 from the node B and the node E acquires the information RB1 from the node D. With regard to the node A, the authentication server S sends the authorization information "C provide *" to the proxy node C in the procedure P3, and the proxy node C transfers the authorization information "A read|write|execute RB1" from the authentication server S to the node A in the procedure P4. Further, with regard to the node B, the authentication server S sends the authorization information "B provide RB1" to the node B in the procedure P3, and the node B transfers the authorization information "C read|write|execute *" from the authentication server S to the proxy node C in the procedure P4.

With regard to the node E, the authentication server S sends the authorization information "C provide *" to the proxy node C in the procedure P3, and the proxy node C transfers the authorization information "E read|write|execute RB1" from the authentication server S to the node E in the procedure P4. Further, with regard to the node D, the authentication server S sends the authorization information "D provide RB1" to the node D in the procedure P3, and the node D transfers the authorization information "C read|write|execute *" from the authentication server S to the proxy node C in the procedure P4.

When the authorization information of the access control is given to each of the nodes A, B, D and E, and the proxy node C as explained in the above, the proxy node C permits the node A to access the node B, and permits the node E to access the node D. In other words, the proxy node C accesses the node B in response to being accessed by the node A, and then the response from the node B is sent to the node A via the proxy node C. The proxy node C accesses the node D in response to being accessed by the node E, and then the response from the node D is sent to the node E via the proxy node C.

In this instance, the proxy node C has the group identifier associated with the session key. When the node A requests the access control with regard to the information RB1, the information RB1 of the node B which has the same group identifier G1 as the node A is sent to the node A. When the node E requests the access control with regard to the information RB1, the information RB1 of the node D which has the same group identifier G2 as the node E is sent to the node E.

The other configurations and operations of the present embodiment are the same as those of the second embodiment. The operation instance illustrated in FIG. 9 is corresponding to the operation instance shown in FIG. 3 where the options are employed in the first embodiment, but can be modified to be corresponding to the operation instance shown in FIG. 1 which has no options.

In the aforementioned key authentication system of the present embodiment, each node has a group identifier. The additional information includes the group identifier. The access control is performed by use of the group identifier.

In brief, the group identifier is allocated to each of the nodes A, B, D, and E. The first additional information "α" and the second additional information "β" include the group identifier. The proxy node C (the access control unit 42) is configured to execute the access control by use of the group identifier.

As described in the above, the use of the group identifier for the access control enables to define a range of the access control. In other words, the group identifier can restrict a range over which the encryption message extends.

The invention claimed is:

1. An encryption key distribution system comprising:
a first node;
a second node; and
an authentication server configured to create a session key used for encryption communication between said first node and said second node,
wherein said first node and said authentication server are configured to retain a first secret key used for encryption communication between said first node and said authentication server,
said second node and said authentication server being configured to retain a second secret key used for encryption communication between said second node and said authentication server,
said first node being configured to create a first nonce and sends the created first nonce,
said second node being configured to create a second nonce and sends the created second nonce,
said authentication server being configured to
newly create the session key in response to receiving the first nonce and the second nonce, and
calculate a first message authentication code value by use of the first secret key from a first message including the received first nonce, the newly created session key, and predetermined first additional information, and
create a first encryption message by encrypting the received first nonce, the newly created session key, and the first additional information with the first secret key, and
send the first encryption message and the first message authentication code value, and
calculate a second message authentication code value by use of the second secret key from a second message including the received second nonce, the newly created session key, and predetermined second additional information, and
create a second encryption message by encrypting the received second nonce, the newly created session key, and the second additional information with the second secret key, and
send the second encryption message and the second message authentication code value,
said first node being configured to
in response to receiving the first encryption message and the first message authentication code value, obtain the session key and the first additional information by decrypting the first encryption message with the first secret key, and
calculate the first message authentication code value by use of the first nonce stored in said first node, the session key and the first additional information obtained by decrypting the first encryption message, and the first secret key, and
authenticate the session key received from the authentication server by judging whether or not the first message authentication code value calculated by said first node is equal to the first message authentication code value received from said authentication server, and
said second node being configured to
in response to receiving the second encryption message and the second message authentication code value, obtain the session key and the second additional information by decrypting the second encryption message with the second secret key, and
calculate the second message authentication code value by use of the second nonce stored in said second node, the session key and the second additional information obtained by decrypting the second encryption message, and the second secret key, and
authenticate the session key received from said authentication server by judging whether or not the second message authentication code value calculated by said second node is equal to the second message authentication code value received from said authentication server.

2. An encryption key distribution system as set forth in claim 1, wherein
said first additional information and said second additional information are defined as authorization information regarding access control.

3. An encryption key distribution system as set forth in claim 2, wherein
said authentication server is configured to, upon receiving request information regarding the access control from said first node or said second node, compare the received request information regarding the access control with registration information regarding the access control preliminarily registered,
said authentication server being configured to, upon acknowledging that the registration information regarding the access control does not include the same information as the received request information regarding the access control, use the registration information regarding the access control as the authorization information of the access control.

4. An encryption key distribution system as set forth in claim 2, wherein
said encryption key distribution system further comprises a proxy node configured to relay communication between said first node and said second node,
said authentication server being configured to send the authorization information regarding the access control to said proxy node, and
said proxy node being configured to relay the communication between said first node and said second node on the basis of to the authorization information regarding the access control received from said authentication server.

5. An encryption key distribution system as set forth in claim 4, wherein
    said first node and said second node have a group identifier,
    said first additional information and said second additional information including the group identifier, and
    said proxy node being configured to execute the access control by use of the group identifier.

6. An encryption key distribution system as set forth in claim 2, wherein
    said authentication server is configured to create the authorization information regarding the access control on the basis of changeable registration information regarding the access control.

7. An encryption key distribution system as set forth in claim 2, wherein
    said authentication server is configured to, upon receiving the request information regarding the access control from said first node or said second node, perform a logical operation of the received request information regarding the access control and registration information regarding the access control preliminarily registered, thereby creating the authorization information regarding the access control.

* * * * *